US011535697B2

(12) United States Patent
Jaehnigen et al.

(10) Patent No.: US 11,535,697 B2
(45) Date of Patent: *Dec. 27, 2022

(54) THERMOPLASTIC POLYURETHANE

(71) Applicant: BASF SE, Ludwigshafen am Rhein (DE)

(72) Inventors: Julia Christa Jaehnigen, Ludwigshafen (DE); Nabarun Roy, Wyandotte, MI (US); Elmar Poeselt, Lemfoerde (DE); Dejan Petrovic, Lemfoerde (DE); Peter Gutmann, Ludwigshafen (DE); Dirk Kempfert, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 88 days.

This patent is subject to a terminal disclaimer.

(21) Appl. No.: 16/632,230

(22) PCT Filed: Jul. 19, 2018

(86) PCT No.: PCT/EP2018/069622
§ 371 (c)(1),
(2) Date: Jan. 17, 2020

(87) PCT Pub. No.: WO2019/016313
PCT Pub. Date: Jan. 24, 2019

(65) Prior Publication Data
US 2020/0231739 A1 Jul. 23, 2020

(30) Foreign Application Priority Data

Jul. 20, 2017 (EP) .................................. 17182344

(51) Int. Cl.
| C08G 18/66 | (2006.01) |
| C08G 18/32 | (2006.01) |
| C08G 18/42 | (2006.01) |
| C08G 18/61 | (2006.01) |
| C08G 18/73 | (2006.01) |
| C08G 18/76 | (2006.01) |
| C08J 9/16 | (2006.01) |
| C08G 101/00 | (2006.01) |
| C08L 75/04 | (2006.01) |

(52) U.S. Cl.
CPC ..... C08G 18/6651 (2013.01); C08G 18/3203 (2013.01); C08G 18/324 (2013.01); C08G 18/4238 (2013.01); C08G 18/61 (2013.01); C08G 18/664 (2013.01); C08G 18/73 (2013.01); C08G 18/7671 (2013.01); C08J 9/16 (2013.01); C08G 2101/00 (2013.01); C08J 2375/04 (2013.01); C08L 75/04 (2013.01)

(58) Field of Classification Search
CPC .......... C08G 18/61; C08G 18/42–4297; C08G 18/48–5096; C08G 18/6633–6662
See application file for complete search history.

(56) References Cited

U.S. PATENT DOCUMENTS

| 4,371,684 A | 2/1983 | Quiring et al. |
| 5,945,185 A | 8/1999 | Hirai et al. |
| 9,097,835 B2 | 8/2015 | Prissok et al. |
| 2012/0190762 A1* | 7/2012 | Hubel ................ C08G 18/7621 521/112 |
| 2013/0004454 A1* | 1/2013 | Weiss ..................... B01D 71/68 424/78.09 |
| 2015/0174808 A1 | 6/2015 | Rudolph et al. |
| 2015/0337102 A1 | 11/2015 | Schiller et al. |
| 2017/0029554 A1 | 2/2017 | Ahn et al. |
| 2020/0017626 A1* | 1/2020 | Wang ................... C08G 18/664 |
| 2021/0163668 A1* | 6/2021 | Bokel ................ C08G 18/4854 |

FOREIGN PATENT DOCUMENTS

| CN | 106832184 | 6/2017 |
| DE | 28 17 457 A1 | 10/1979 |
| DE | 697 13 614 T2 | 1/2003 |
| DE | 697 13 614 T2 | 1/2003 |

(Continued)

OTHER PUBLICATIONS

Szycher (Structure-Property Relations in Polyurethanes from: Szycher's Handbook of Polyurethanes CRC Press. Published online on: Jul. 13, 2012). (Year: 2012).*
International Preliminary Report on Patentability and Written Opinion dated Jan. 30, 2020 in PCT/EP2018/069622 (with English translation), citing documents AG through AK therein, 17 pages.
International Search Report dated Oct. 31, 2018 in in PCT/EP2018/069622 (submitting English translation only), citing documents AG through AK therein, 3 pages.
Yu, et al., "*Crosslinked waterborne polyurethane with high waterproof performance*", Polymer Chemistry, vol. 7, 2016, pp. 3913-3922.
U.S. Appl. No. 12/659,629, filed Mar. 15, 2010, US 2010-0209643 A1, Henze, O.S. et al.

(Continued)

*Primary Examiner* — Michael M Dollinger
(74) *Attorney, Agent, or Firm* — Grüneberg and Myers PLLC

(57) ABSTRACT

The present invention relates to a polyurethane, in particular a thermoplastic polyurethane, obtainable or obtained by reacting at least the components (i) to (ii):
(i) a polyisocyanate composition;
(ii) a polyol composition, comprising
  (ii.1) at least one polyester diol or polyether diol having a number-average molecular weight in the range from 500 to 3000 g/mol,
  (ii.2) at least one polysiloxane having two terminal isocyanate-reactive functionalities selected from the group consisting of thio group, hydroxyl group and amino group.
The invention additionally relates to a process for preparing this polyurethane, to the use thereof, to a molded body comprising the polyurethane. Furthermore, the invention relates to foam beads based on polyurethane, obtained or obtainable from the polyurethane, to a process for producing foam beads and also to bead foams and to the use thereof.

27 Claims, No Drawings

(56) References Cited

FOREIGN PATENT DOCUMENTS

| | | |
|---|---|---|
| DE | 10 2015 225 456 A1 | 2/2017 |
| EP | 0 891 999 A1 | 1/1999 |
| EP | 0 922 552 A1 | 6/1999 |
| EP | 1 979 401 B1 | 10/2008 |
| EP | 2 872 309 B1 | 5/2015 |
| EP | 3 053 732 A1 | 8/2016 |
| EP | 3581603 | 12/2019 |
| JP | 63-179916 A | 7/1988 |
| JP | H03-21675 | 1/1991 |
| JP | 2011-157451 | 8/2011 |
| JP | 2016-500708 | 1/2016 |
| JP | 2017-519059 | 7/2017 |
| WO | WO 94/20568 A1 | 9/1994 |
| WO | WO 2005/023920 A1 | 3/2005 |
| WO | WO 2006/082183 A1 | 8/2006 |
| WO | WO 2007/082838 A1 | 7/2007 |
| WO | WO 2010/010010 A1 | 1/2010 |
| WO | WO 2010/076224 A1 | 7/2010 |
| WO | WO 2013/153190 A1 | 10/2013 |
| WO | WO 2014/150122 A2 | 9/2014 |
| WO | WO 2014/198779 A1 | 12/2014 |
| WO | WO 2016/146537 A1 | 9/2016 |
| WO | WO 2017/030835 A1 | 2/2017 |
| WO | WO 2014/150124 A1 | 9/2017 |

OTHER PUBLICATIONS

U.S. Appl. No. 11/753,096, filed Feb. 2, 2007, US 2008-0015328 A1, Henze, O.S., et al.
U.S. Appl. No. 13/331,641, filed Dec. 20, 2011, US 2012-0163927 A1, Kaminsky T., et al.
U.S. Appl. No. 13/799,729, filed Mar. 13, 2013, US 2013-0245169 A1, Henze, O.S., et al.
U.S. Appl. No. 16/632,230, filed Jan. 17, 2020, Jaehnigen, J.C., et al.
International Preliminary Report on Patentability and Written Opinion dated Jan. 30, 2020 in PCT/EP2018/069622 (with English translation), 17 pages.
International Search Report dated Oct. 31, 2018 in in PCT/EP2018/069622 (submitting English translation only), 3 pages.
"Kunststoffhandbuch, Band 7, Polyurethane" Carl Hanser Verlag, 3. Auflage, 1993, Kapitel 3.1, 3.2 und 3.3.2, S. 103-113.
Saechtling (Hg.), Kunststoff-Taschenbuch, 27. Auflage, Hanser-Verlag München 1998, Kap. 3.2.1 und 3.2.4.

\* cited by examiner

THERMOPLASTIC POLYURETHANE

The present invention relates to a polyurethane, in particular a thermoplastic polyurethane, obtainable or obtained by reacting at least the components (i) to (ii): (i) a polyisocyanate composition; (ii) a polyol composition, comprising (ii.1) at least one polyester diol or polyether diol, wherein the polyester diol or polyether diol has a number-average molecular weight in the range from 500 to 3000 g/mol, (ii.2) at least one polysiloxane having two terminal isocyanate-reactive functionalities selected from the group consisting of thio group, hydroxyl group and amino group.

The invention additionally relates to a process for preparing this polyurethane, to the use thereof and to a molded body comprising the polyurethane. Furthermore, the invention relates to foam beads based on polyurethane, obtained or obtainable from the polyurethane, to a process for producing foam beads and also to bead foams and to the use thereof.

Thermoplastic polyurethanes for various applications are known in principle from the prior art. By the variation in the feedstocks, it is possible to obtain different profiles of properties.

The properties of polyurethanes and silicone elastomers are complementary within wide ranges. Polyurethanes are notable for their excellent mechanical strength, elasticity and very good adhesion, abrasion resistance and also simple processing by means of extrusion from the melt. Silicone elastomers, in contrast, possess exceptional temperature, UV, and weathering stability. They retain their elastic properties at relatively low temperatures and therefore also do not have a tendency toward embrittlement. In addition to this, they possess particular water-repellent and anti-adhesive surface properties. The combination of urethane and silicone polymers makes materials available which have good mechanical properties and which at the same time are notable for processing options that are greatly simplified compared to silicones, while still possessing the positive properties of silicones. However, sufficient compatibility is not achieved for polymer blends in all cases, and in addition the properties of polymer blends often differ markedly from those of the original polymers. A further disadvantage is that there is often "blooming" or phase migration of incompatible siloxanes.

Depending on the nature of the application, the properties of polyurethanes can be varied via the nature of the feedstocks and the quantitative ratios used. For example, for the use as tube material or for the use as cable sheathing, it is advantageous to maintain the mechanical properties of thermoplastic polyurethanes used even in the presence of relatively high temperatures. For applications close to the body, such as for example wristbands or parts of jewelry, but also various protective applications such as protective films, protective covers, it is often desirable to have exceptional tactile properties and good hydrophobicity, and also improved mechanical properties, especially elongation at break and tensile strength.

One object underlying the present invention was therefore that of providing materials having improved tactile properties, good hydrophobicity and also good mechanical properties, especially elongation at break and tensile strength. A further object underlying the present invention was that of providing improved materials, the mechanical properties of which are conserved even at elevated temperatures.

According to the invention, this object is achieved by a polyurethane, in particular thermoplastic polyurethane, obtainable or obtained by reacting at least the components (i) to (ii):
(i) a polyisocyanate composition;
(ii) a polyol composition, comprising
  (ii.1) at least one polyester diol or polyether diol having a number-average molecular weight in the range from 500 to 3000 g/mol,
  (ii.2) at least one polysiloxane having two terminal isocyanate-reactive functionalities selected from the group consisting of thio group, hydroxyl group and amino group.

The invention also relates to a polyurethane, in particular thermoplastic polyurethane, obtainable or obtained by reacting at least the components (i) to (iii):
(i) a polyisocyanate composition;
(ii) a polyol composition, comprising
  (ii.1) at least one polyester diol or polyether diol having a number-average molecular weight in the range from 500 to 3000 g/mol,
  (ii.2) at least one polysiloxane having two terminal isocyanate-reactive functionalities selected from the group consisting of thio group, hydroxyl group and amino group;
(iii) a chain extender composition.

Here, the polysiloxane is incorporated into the matrix, as a result of which negative effects such as blooming or phase migration are suppressed. Surprisingly, the inventive thermoplastic polyurethanes having polysiloxane incorporated into the matrix (Si-TPUs) have improved tactile properties and a hydrophobicity that is comparable to that of pure silicone plastics. Furthermore, the Si-TPUs according to the invention have improved stability on thermal aging, for instance, in particular in the case of relatively soft Si-TPUs having a Shore hardness in the range from 25A-70A, especially in the range from 55 to 70 A, markedly improved results are achieved extremely surprisingly on thermal aging in the accelerated test; likewise, for relatively soft TPUs the mechanical performance compared to the siloxane-free TPUs is markedly improved, especially with respect to abrasion, elongation at break and tensile strength. For relatively hard Si-TPUs (Shore hardnesses in the range from 85A to 64D, especially in the range from 85A to 95A), likewise improved results are surprisingly obtained on thermal ageing, even in the long-term test.

The polyurethane, in particular the thermoplastic polyurethane, has a melt mass-flow rate (MFR), determined according to DIN EN ISO 1133 (March 2012 version), in the range from 28 to 350 g/10 min, measured at a temperature in the range from 190 to 220° C. and at a mass in the range from 1 to 30 kg. The MFR is measurable in the temperature range from 190–200° C., the material thus capable of flowing. Preferably, the polyurethane, in particular the thermoplastic polyurethane, at a mass in the range from 5 to 35 kg in the temperature range from 190–220° C., has an MFR in the range from 20 to 350 g/10 min. More preferably, the polyurethane, in particular the thermoplastic polyurethane, at a mass in the range from 10 to 25 kg in the temperature range from 190–220° C., has an MFR in the range from 40 to 330 g/10 min and, more preferably, at a mass in the range from 20 to 25 kg and a temperature of 190° C., has an MFR in the range from 40 to 85 g/10 min.

The at least one polysiloxane as per (ii.2) has two terminal isocyanate-reactive functionalities selected from the group consisting of thio group, hydroxyl group and amino group, that is to say it has on average a functionality between 1.8 and 2.3, preferably between 1.9 and 2.2, especially 2. The at least one polysiloxane used according to the invention preferably has solely primary hydroxyl groups.

The invention also relates to a polyurethane, in particular thermoplastic polyurethane, obtainable or obtained by reacting at least the components (i) to (iii):
(i) a polyisocyanate composition;
(ii) a polyol composition, comprising
    (ii.1) at least one polyester diol or polyether diol having a number-average molecular weight in the range from 500 to 3000 g/mol,
    (ii.2) at least one polysiloxane of general formula I

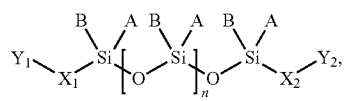

(I)

where n is an integer in the range from 1 to 250. A and B are independently selected from the group of the C1-C20-alkyl groups; $X_1$ is selected from the group consisting of $(CH_2—CH_2—O)_m$ group, $(CH_2—CH_2—CH_2—O)_m$ group, $(CH_2—CHCH_3—O)_m$ group, $(CH_2)_m—O$ group and $(CH_2)_m$ group, $X_2$ is selected from the group consisting of $(O—CH_2—CH_2)_m$ group, $(O—CHCH_3—CH_2)_m$ group, $(O—CH_2—CH_2—CH_2)_m$ group, $O—(CH_2)_m$ group and $—(CH_2)_m$ group, where m for $X_1$, $X_2$ in each case independently is an integer in the range from 1 to 100; and $Y_1$, $Y_2$ are independently selected from the group consisting of thio group, hydroxyl group and amino group;
(iii) a chain extender composition.

In one embodiment, the polyurethane, in particular the thermoplastic polyurethane, is obtainable or obtained by reacting at least the components (i) to (iii):
(i) a diisocyanate composition;
(ii) a polyol composition, comprising
    (ii.1) at least one dihydric polyester diol or polyether diol having a number-average molecular weight in the range from 500 to 3000 g/mol,
    (ii.2) at least one polysiloxane of general formula I

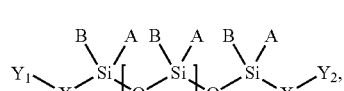

(I)

where n is an integer in the range from 1 to 250, A and B are independently selected from the group of the C1-C20-alkyl groups; $X_1$ is selected from the group consisting of $(CH_2—CH_2—O)_m$ group, $(CH_2—CH_2—CH_2—O)_m$ group, $(CH_2—CHCH_3—O)_m$ group, $(CH_2)_m—O$ group and $(CH_2)_m$ group, $X_2$ is selected from the group consisting of $(O—CH_2—CH_2)_m$ group, $(O—CHCH_3—CH_2)_m$ group, $(O—CH_2—CH_2—CH_2)_m$ group, $O—(CH_2)_m$ group and $—(CH_2)_m$ group, where m for $X_1$, $X_2$ in each case independently is an integer in the range from 1 to 100; and $Y_1$, $Y_2$ are independently selected from the group consisting of thio group, hydroxyl group and amino group;
(iii) a chain extender composition.

In a preferred embodiment of the polyurethane, in particular of the thermoplastic polyurethane, the index n of the at least one polysiloxane as per (ii.2) is an integer in the range from 3 to 50 or in the range from 100 to 240.

In a preferred embodiment of the polyurethane, in particular of the thermoplastic polyurethane, A and B of the polysiloxane as per (ii.2) are independently selected from the group of the C1- to C5-alkyl groups, preferably A and B are each identical and are selected from the group of the C1- to C5-alkyl groups, wherein more preferably A and B are both a methyl group.

In a preferred embodiment of the polyurethane, in particular of the thermoplastic polyurethane, the index m for $X_1$, $X_2$ of the polysiloxane as per (ii.2) in each case independently is an integer in the range from 1 to 50, preferably in the range from 1 to 20, more preferably in the range from 1 to 15.

In a preferred embodiment of the polyurethane, in particular of the thermoplastic polyurethane, $Y_1$ and $Y_2$ of the polysiloxane as per (ii.2) are both a hydroxyl group or both an amino group.

In a preferred embodiment of the polyurethane, in particular of the thermoplastic polyurethane, $X_1$ of the polysiloxane as per (ii.2) is a $(CH_2—CH_2—O)_m$ group or a $(CH_2—CH_2—CH_2—O)_m$ group or a $(CH_2—CHCH_3—O)_m$ group, $X_2$ of the polysiloxane as per (ii.2) is an $(O—CHCH_3—CH_2)_m$ group or an $(O—CH_2—CH_2)_m$ group or an $(O—CH_2—CH_2—CH_2)_m$ group, where m for $X_1$, $X_2$ in each case independently is an integer in the range from 2 to 20; and $Y_1$ and $Y_2$ are both a hydroxyl group.

In a particularly preferred embodiment of the polyurethane, in particular of the thermoplastic polyurethane, the index n of the at least one polysiloxane as per (ii.2) is an integer in the range from 3 to 50, preferably in the range from 5 to 40, more preferably in the range from 10 to 20; $X_1$ of the polysiloxane as per (ii.2) is a $(CH_2—CH_2—O)_m$ group, $X_2$ of the polysiloxane as per (ii.2) is an $(O—CH_2—CH_2)_m$ group, where m for $X_1$, $X_2$ in each case independently is an integer in the range from 2 to 20, more preferably in the range from 3 to 15; and $Y_1$ and $Y_2$ are both a hydroxyl group.

In a further particularly preferred embodiment of the polyurethane, in particular of the thermoplastic polyurethane, the index n of the at least one polysiloxane as per (ii.2) is an integer in the range from 100 to 240, preferably in the range from 110 to 235; $X_1$ and $X_2$ of the polysiloxane as per (ii.2) are both a $(CH_2)_m$ group, where m is an integer in the range from 1 to 50, more preferably in the range from 2 to 10, more preferably in the range from 2 to 5, more preferably is 3, and $Y_1$, $Y_2$ of the polysiloxane as per (ii.2) are both an amino group.

In a further particularly preferred embodiment of the polyurethane, in particular of the thermoplastic polyurethane, the index n of the at least one polysiloxane as per (ii.2) is an integer in the range from 3 to 50, more preferably in the range from 20 to 40; $X_1$ and $X_2$ of the polysiloxane as per (ii.2) are both a $(CH_2)_m$ group, where m is an integer in the range from 1 to 50, more preferably in the range from 2 to 10, more preferably in the range from 2 to 5, more preferably is 3, and $Y_1$, $Y_2$ of the polysiloxane as per (ii.2) are both an amino group.

In a further particularly preferred embodiment of the polyurethane, in particular of the thermoplastic polyurethane, the index n of the at least one polysiloxane as per (ii.2) is an integer in the range from 3 to 50, preferably in the range from 10 to 30; $X_1$ and $X_2$ of the polysiloxane as per (ii.2) are both a $(CH_2)_m$ group, where m is zero or an integer in the range from 1 to 20, preferably in the range from 1 to 10, more preferably is 1, and $Y_1$, $Y_2$ of the polysiloxane as per (ii.2) are both a hydroxyl group.

In a preferred embodiment of the polyurethane, in particular of the thermoplastic polyurethane, the at least one polysiloxane as per (ii.2) is present in a proportion in the range from 0.1% to 50% by weight, preferably in the range from 1% to 30% by weight, more preferably in the range from 5% to 20% by weight, based on the total weight of all of components (ii.1) and (ii.2). The invention therefore also relates to a polyurethane, in particular a thermoplastic polyurethane, as described above, in which the at least one polysiloxane as per (ii.2) is present in a proportion in the range from 0.1% to 50% by weight, preferably in the range from 1% to 39% by weight, more preferably in the range from 1% to 30% by weight, more preferably in the range from 7% to 30% by weight, more preferably in the range from 5% to 20% by weight, based on the total weight of all of components (ii.1) and (ii.2).

In a preferred embodiment, the polyurethane, in particular the thermoplastic polyurethane, has a hard segment content in the range from 10% to 60% by weight, preferably in the range from 10% to 50% by weight, more preferably in the range 15% to 40% by weight, more preferably in the range from 17% to 30% by weight, based on the total weight of all of components (i), (ii), (iii).

Accordingly, the present invention in a further embodiment relates to a polyurethane, in particular a thermoplastic polyurethane, as described above, which has a hard segment content in the range from 10% to 60%, preferably in the range from 10% to 50% by weight, more preferably in the range from 15% to 40%, more preferably in the range from 17% to 30% by weight, based on the total weight of all of components (i), (ii), (iii).

In a preferred embodiment, the polyurethane, in particular the thermoplastic polyurethane, has a hardness in the range from Shore 30A to 98AA or in the range from Shore 40D to 64D, preferably in the range from Shore 30A to 95A, more preferably in the range from Shore 70A to 95A. Shore hardnesses in the range from 70A to 95A are especially preferred in the event of use for foam beads.

In a particularly preferred embodiment of the polyurethane, in particular of the thermoplastic polyurethane, the at least one polysiloxane as per (ii.2) is present in a proportion in the range from 0.1% to 60% by weight, preferably in the range from 1% to 60% by weight, more preferably in the range from 1% to 50% by weight, more preferably in the range from 1% to 30% by weight, more preferably in the range from 5% to 45% by weight, more preferably in the range from 5% to 20% by weight, based on the total weight of all of components (ii.1) and (ii.2), and the polyurethane, in particular the thermoplastic polyurethane, has a hard segment content in the range from 10% to 50% by weight, preferably from 15% to 40% by weight, more preferably in the range from 17% to 30% by weight, based on the total weight of all of components (i), (ii), (iii). The invention accordingly also relates to a polyurethane, in particular a thermoplastic polyurethane, as described above, in which the at least one polysiloxane as per (ii.2) is present in a proportion in the range from 0.1% to 60% by weight, preferably in the range from 0.1% to 50% by weight, more preferably in the range from 1% to 30% by weight, more preferably in the range from 5% to 45% by weight, more preferably in the range from 5% to 20% by weight, based on the total weight of all of components (ii.1) and (ii.2), and which has a hard segment content in the range from 10% to 50% by weight, preferably in the range from 15% to 40% by weight, more preferably in the range from 17% to 30% by weight, based on the total weight of all of components (i), (ii), (iii).

According to the invention, as per (iii) a chain extender composition is used. In an embodiment of the polyurethane, in particular of the thermoplastic polyurethane, the chain extender composition as per (iii) comprises at least one compound having at least two isocyanate-reactive functional groups, preferably two isocyanate-reactive functional groups, where the isocyanate-reactive functional groups are preferably selected from the group of hydroxyl group, amino group and thiol group. According to the invention, a chain extender is understood to mean a compound having a molecular weight Mw of less than 300 g/mol. Within the context of the present invention, the polyol composition as per (ii) is also free of such compounds here. According to the invention, chain extenders may be used that are known for the preparation of polyurethanes. Possible low molecular weight chain extenders are mentioned, for example, in "Kunststoffhandbuch, Band 7, Polyurethane" [Plastics Handbook, volume 7, Polyurethanes], Carl Hanser Verlag, 3rd edition 1993, chapters 3.2 and 3.3.2. In a preferred embodiment of the polyurethane, in particular of the thermoplastic polyurethane, the at least one compound having isocyanate-reactive functional groups is selected from the group consisting of ethane-1,2-diol, butane-1,4-diol, hexane-1,6-diol and 2,4-diamino-3,5-di(methylthio)toluene, and is preferably butane-1,4-diol.

According to the invention, as per (ii.1) at least one polyester diol or polyether diol, that is to say at least one dihydric polyester polyol or polyether polyol, is used. Diols are fundamentally known to those skilled in the art and described for example in "Kunststoffhandbuch, Band 7, Polyurethane" [Plastics Handbook, volume 7, Polyurethanes], Carl Hanser Verlag, 3rd edition 1993, chapter 3.1. Polyester diols or polyether diols are used according to the invention. Polycarbonates could also be used. Copolymers could also be used in the context of the present invention. The number-average molecular weight $M_n$ of the diols used according to the invention is in the range from $0.5\times10^3$ g/mol to $3\times10^3$ g/mol, preferably between $0.8\times10^3$ g/mol and $3\times10^3$ g/mol.

The at least one polyester diol or polyether diol is dihydric, that is to say it has an average functionality of between 1.8 and 2.3, preferably between 1.9 and 2.2, in particular 2. The polyester diols or polyether diols used in accordance with the invention preferably have solely primary hydroxyl groups.

In a preferred embodiment of the polyurethane, in particular of the thermoplastic polyurethane, the polyester diol or polyether diol as per (ii.1) is selected from the group consisting of polyethylene glycol, polypropylene glycol, polyadipates, polycarbonates/polycarbonate diols and polycaprolactones and polytetrahydrofuran (PTHF), preferably from the group of polyester diols and PTHF, where the polyester diol is preferably formed from adipic acid, butane-1,4-diol and hexane-1,6-diol; more preferably is PTHF, where the PTHF preferably has a number-average molecular weight $M_n$ in the range from 500 to 3000 g/mol, preferably in the range from 1000 to 2000 g/mol.

According to the invention, as per (i) a polyisocyanate composition is used. The polyisocyanate composition here comprises at least one polyisocyanate. According to the invention, the polyisocyanate composition may also comprise two or more polyisocyanates. Preferred polyisocyanates within the context of the present invention are diisocyanates, especially aliphatic or aromatic diisocyanates.

In addition, in the context of the present invention, isocyanate components used may be prereacted prepolymers in which some of the OH components have been reacted with an isocyanate in a preceding reaction step. These prepolymers are reacted with the remaining OH components in a subsequent step, the actual polymer reaction, and then form the thermoplastic polyurethane. The use of prepolymers offers the option of also using OH components having secondary alcohol groups.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethythexamethylene 1,6-diisocyanate, 1-isocyanato-3,3,5-trimethyl-5-isocyanatomethylcyclohexane (isophorone diisocyanate. IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI). Suitable aromatic diisocyanates are especially naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or diphenylmethane diisocyanates (MDI).

In a preferred embodiment of the polyurethane, in particular of the thermoplastic polyurethane, the polyisocyanate composition as per (i) comprises at least one polyisocyanate selected from the diisocyanates, preferably selected from the group consisting of diphenylmethane 2,2'-diisocyanate (2,2'-MDI), diphenylmethane 2,4'-diisocyanate (2,4'-MDI), diphenylmethane 4,4'-diisocyanate (4,4'-MDI), hexamethylene 1,6-diisocyanate (HDI) and methylene dicyclohexyl 4,4',2,4'- and 2,2'-diisocyanate (H12MDI).

According to the invention, the polyisocyanate composition as per (i) may also comprise one or more solvents. Suitable solvents are known to those skilled in the art. Suitable examples are nonreactive solvents such as ethyl acetate, methyl ethyl ketone and hydrocarbons.

According to the invention, the components (i) to (iii) are used in a ratio such that the molar ratio of the sum of the functionalities of the polyol composition (ii), especially polyester diol or polyether diol as per (ii.1) and polysiloxane (ii.2), and chain extender composition (ii) used to the sum of the functionalities of the polyisocyanate composition (i) used is in the range from 1:0.8 to 1:1.3. Preferably, the ratio is in the range from 1:0.9 to 1:1.2, more preferably in the range from 1:0.965 to 1:1.05, particularly preferably in the range from 1:0.98 to 1:1.03.

In a particularly preferred embodiment, the invention relates to a polyurethane, in particular a thermoplastic polyurethane, obtainable or obtained by reacting at least the components (i) to (iii):
(i) a diisocyanate composition comprising at least 4,4'-MDI or HDI;
(ii) a polyol composition, comprising
   (ii.1) at least one polyether diol, preferably PTHF, or one polyester diol, wherein the polyether diol or polyester diol has a number-average molecular weight in the range from 500 to 3000 g/mol,
   (ii.2) at least one polysiloxane of general formula Ia

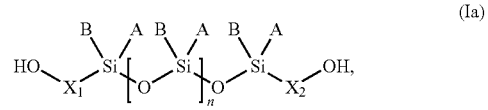

where n is an integer in the range from 10 to 20, A and B are both methyl groups; $X_1$ is a $(CH_2-CH_2-O-)_m$ group. $X_2$ is an $(O-CH_2-CH_2)_m$ group, where m for $X_1$, $X_2$ in each case independently is an integer in the range from 3 to 15,
(iii) a chain extender composition comprising at least one diol or diamine selected from the group consisting of butane-1,4-diol, hexane-1,6-diol, ethane-1,2-diol and 2,4-diamino-3,5-di(methylthio)toluene.

In a further particularly preferred embodiment, the invention relates to a polyurethane, in particular a thermoplastic polyurethane, obtainable or obtained by reacting at least the components (i) to (iii):
(i) a diisocyanate composition comprising at least MDI;
(ii) a polyol composition, comprising
   (ii.1) at least one polyether diol, preferably PTHF, having a number-average molecular weight in the range from 500 to 3000 g/mol,
   (ii.2) at least one polysiloxane of general formula Ia

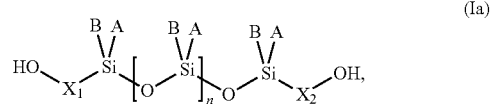

where n is an integer in the range from 10 to 20, A and B are both methyl groups; $X_1$ is a $(CH_2-CH_2-O-)_m$ group, $X_2$ is an $(O-CH_2-CH_2)_m$ group, where m for $X_1$, $X_2$ is identical and is an integer in the range from 3 to 15;
   (iii) a chain extender composition comprising at least hexane-1,6-diol.

The polyurethane, in particular the thermoplastic polyurethane, in this embodiment preferably has a melt mass-flow rate, determined according to DIN EN ISO 1133 (March 2012 version) and measured at a temperature of 190° C. and 21.6 kg, in the range from 20 to 350 g/10 min, preferably in the range from 35 to 90 g/10 min, more preferably in the range from 40 to 85 g/10 min.

In a further particularly preferred embodiment, the invention relates to a polyurethane, in particular a thermoplastic polyurethane, obtainable or obtained by reacting at least the components (i) to (iii):
(i) a diisocyanate composition comprising at least HDI;
(ii) a polyol composition, comprising
   (ii.1) at least one polyester diol having a number-average molecular weight in the range from 500 to 3000 g/mol,
   (ii.2) at least one polysiloxane of general formula Ia

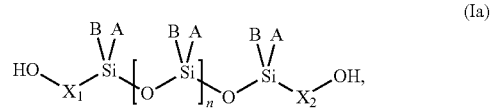

where n is an integer in the range from 10 to 20, A and B are both methyl groups; $X_1$ is a $(CH_2-CH_2O-)_m$ group, $X_2$ is an $(O-CH_2-CH_2)_m$ group, where m for $X_1$, $X_2$ is identical and is an integer in the range from 3 to 15;
(iii) a chain extender composition comprising at least hexane-1,6-diol.

The polyurethane, in particular the thermoplastic polyurethane, in this embodiment preferably has a melt mass-flow rate, determined according to DIN EN ISO 1133 (March 2012 version) and measured at a temperature of 190° C. and 3.8 kg, in the range from 20 to 350 g/10 min, preferably in the range from 28 to 220 g/10 min, more preferably in the range from 28 to 215 g/10 min.

In a further particularly preferred embodiment, the invention relates to a polyurethane, in particular thermoplastic polyurethane, obtainable or obtained by reacting at least the components (i) to (iii):
(i) a diisocyanate composition comprising at least 4,4'-MDI;
(ii) a polyol composition, comprising
  (ii.1) at least one polyester diol having a number-average molecular weight $M_n$ in the range from 500 to 3000 g/mol,
  (ii.2) at least one polysiloxane of general formula Ia

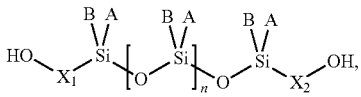

(Ia)

where n is an integer in the range from 10 to 20, A and B are both methyl groups; $X_1$ is a $(CH_2-CH_2-O-)_m$ group, $X_2$ is an $(O-CH_2-CH_2)_m$ group, where m for $X_1$, $X_2$ is identical and is an integer in the range from 3 to 15;
(iii) a chain extender composition comprising at least butane-1,4-diol.

The polyurethane, in particular the thermoplastic polyurethane, in this embodiment preferably has a melt mass-flow rate, measured at a temperature of 220° C. and 2.16 kg, in the range from 20 to 350 g/10 min, preferably in the range from 60 to 120 g/10 min, more preferably in the range from 65 to 105 g/10 min.

In a further particularly preferred embodiment, the invention relates to a polyurethane, in particular a thermoplastic polyurethane, obtainable or obtained by reacting at least the components (i) to (iii):
(i) a diisocyanate composition comprising at least 4,4'-MDI;
(ii) a polyol composition, comprising
  (ii.1) at least one polyether diol, preferably PTHF, having a number-average molecular weight $M_n$ in the range from 500 to 3000 g/mol,
  (ii.2) at least one polysiloxane of general formula Ia

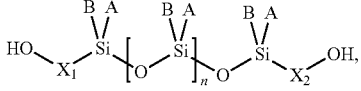

(Ia)

where n is an integer in the range from 10 to 20, A and B are both methyl groups; $X_1$ is a $(CH_2-CH_2-O-)_m$ group, $X_2$ is an $(O-CH_2-CH_2)_m$ group, where m for $X_1$, $X_2$ is identical and is an integer in the range from 3 to 15;

(iii) a chain extender composition comprising at least ethane-1,2-diol or 2,4-diamino-3,5-di(methylthio)toluene, preferably 2,4-diamino-3,5-di(methylthio)toluene.

The polyurethane, in particular the thermoplastic polyurethane, in this embodiment preferably has a melt mass-flow rate, determined according to DIN EN ISO 1133 (March 2012 version) and measured at a temperature of 190° C. and 10 kg, in the range from 20 to 350 g/10 min, preferably in the range from 75 to 350 g/10 min, more preferably in the range from 85 to 340 g/10 min.

According to the invention, further additives, for example catalysts or auxiliaries and additions, may be added during the reaction of the components (i) to (iii). Additions and auxiliaries are known per se to those skilled in the art. It is also possible in accordance with the invention to use combinations of two or more additives.

Within the context of the present invention, the term "additive" is in particular understood to mean catalysts, auxiliaries and additions, especially stabilizers, nucleating agents, fillers such as for example silicates or crosslinkers such as for example polyfunctional aluminosilicates.

In a further embodiment, the present invention accordingly relates to a polyurethane, in particular a thermoplastic polyurethane, as described above, wherein the thermoplastic polyurethane comprises at least one additive.

Examples of auxiliaries and additions include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additions can be found, for example, in the Kunststoffhandbuch [Plastics Handbook], volume 7, published by Vieweg and Höchtlen, Carl Hanser Verlag, Munich 1966 (pp. 103-113).

Suitable catalysts are likewise known in principle from the prior art. Suitable catalysts are for example organic metal compounds selected from the group consisting of tin organyls, titanium organyls, zirconium organyls, hafnium organyls, bismuth organyls, zinc organyls, aluminum organyls and iron organyls, for example tin organyl compounds, preferably tin dialkyls such as dimethyltin or diethyltin, or tin organyl compounds of aliphatic carboxylic acids, preferably tin diacetate, tin dilaurate, dibutyltin diacetate, dibutyltin dilaurate, bismuth compounds, such as bismuth alkyl compounds or the like, or iron compounds, preferably iron(II) acetylacetonate, or the metal salts of carboxylic acids, for example tin(II) isooctoate, tin dioctoate, titanate esters or bismuth(II) neodecanoate.

In a preferred embodiment, the catalysts are selected from tin compounds and bismuth compounds, more preferably tin alkyl compounds or bismuth alkyl compounds. Tin(II) isooctoate and bismuth neodecanoate are particularly suitable.

The catalysts are typically used in amounts of 0 to 2000 ppm, preferably 1 ppm to 1000 ppm, more preferably 2 ppm to 500 ppm and most preferably of 5 ppm to 300 ppm.

Suitable antioxidants are likewise known in principle from the prior art. In one embodiment, the polyurethane, in particular the thermoplastic polyurethane, is obtainable or obtained by reacting at least the components (i) to (ii) and optionally (iii) and additionally
(iv) an antioxidant composition, where the antioxidant composition comprises at least one antioxidant selected from the sterically hindered phenols, preferably selected from the sterically hindered phenols having a tert-butyl group at least in the ortho position adjacent to the OH group, more preferably selected from the group consisting of ethylenebis(oxyethylene) bis(3-(5-tert-butyl-4-hydroxy-m-tolyl)propionate) (Irganox 245 FF, CAS number 36443-68-2), octadecyl 3-(3,5-di-tert-butyl-4-hydroxyphenyl)propionate (Irganox 1076, CAS number 2082-79-3), octyl 3,5-di-tert-butyl-4-hydroxyhydrocinnamate (Irganox 1135, CAS number 125643-61-0), N,N'-hexane-1,6-diylbis[3-(3,5-di-tert-butyl-4-hydroxyphenylpropionamide] (Irganox 1098, CAS number 23128-74-7), pentaerythritol tetrakis(3-(3,5-di-tert-butyl-4-hydroxyphenyl)propionate) (Irganox 1010, CAS number 6683-19-8) and 3,5-bis(tert-butyl)-4-hydroxytoluene (BHT, CAS number 128-37-0), more preferably selected from the group consisting of pentaerythritol tetrakis(3-(3,5-di-tert-butyl-4-hydroxyphenyl) propionate), N,N'-hexane-1,6-diylbis[3-(3,5-di-tert-butyl-4-hydroxyphenylpropionamide] and a mixture of pentaerythritol tetrakis(3-(3,5-di-tert-butyl-4-hydroxyphenyl)propionate) and N,N'-hexane-1,6-diylbis[3-(3,5-di-tert-butyl-4-hydroxyphenylpropionamide].

In a further aspect, the present invention also relates to a process for preparing a polyurethane, in particular a thermoplastic polyurethane, comprising the reaction of the components (i) to (ii):
(i) a polyisocyanate composition;
(ii) a polyol composition, comprising
  (ii.1) at least one polyester diol or polyether diol having a number-average molecular weight in the range from 500 to 3000 g/mol,
  (ii.2) at least one polysiloxane having two terminal isocyanate-reactive functionalities selected from the group consisting of thio group, hydroxyl group and amino group.

In a further aspect, the present invention also relates to a process for preparing a polyurethane, in particular a thermoplastic polyurethane, comprising the reaction of the components (i) to (iii):
(i) a polyisocyanate composition;
(ii) a polyol composition, comprising
  (ii.1) at least one polyester diol or polyether diol having a number-average molecular weight in the range from 500 to 3000 g/mol,
  (ii.2) at least one polysiloxane having two terminal isocyanate-reactive functionalities selected from the group consisting of thio group, hydroxyl group and amino group;
(iii) a chain extender composition.

The present invention further also relates to a process for preparing a polyurethane, in particular a thermoplastic polyurethane, comprising the reaction of the components (i) to (iii):
(i) a polyisocyanate composition;
(ii) a polyol composition, comprising
  (ii.1) at least one polyester diol or polyether diol having a number-average molecular weight in the range from 500 to 3000 g/mol,
  (ii.2) at least one polysiloxane of general formula I

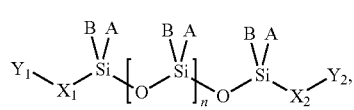

where n is an integer in the range from 1 to 250, A and B are independently selected from the group of the C1-C20-alkyl groups; $X_1$ is selected from the group consisting of $(CH_2-CH_2-O-)_m$ group, $(CH_2-CH_2-CH_2-O)_m$ group, $(CH_2-CHCH_3-O)_m$ group, $(CH_2)_m-O$ group and $(CH_2)_m$ group, $X_2$ is selected from the group consisting of $(O-CH_2-CH_2)_m$ group, $(O-CHCH_3-CH_2)_m$ group, $(O-CH_2-CH_2-CH_2)_m$ group, $-O-(CH_2)_m$ group and $-(CH_2)_m$ group, where m for $X_1$, $X_2$ in each case independently is an integer in the range from 1 to 100; and $Y_1$, $Y_2$ are independently selected from the group consisting of thio group, hydroxyl group and amino group;
(iii) a chain extender composition.

In a preferred embodiment, the invention also relates to a process for preparing a polyurethane, in particular a thermoplastic polyurethane, comprising the reaction of the components (i) to (iii):
(i) a diisocyanate composition;
(ii) a polyol composition, comprising
  (ii.1) at least one dihydric polyester diol or polyether diol having a number-average molecular weight in the range from 500 to 3000 g/mol,
  (ii.2) at least one polysiloxane of general formula I

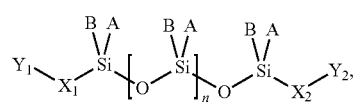

where n is an integer in the range from 1 to 250, A and B are independently selected from the group of the C1-C20-alkyl groups; $X_1$ is selected from the group consisting of $(CH_2-CH_2-O-)_m$ group, $(CH_2-CH_2-CH_2-O)_m$ group, $(CH_2-CHCH_2-O)_m$ group, $(CH_2)_m-O$ group and $(CH_2)_m$ group, $X_2$ is selected from the group consisting of $(O-CH_2-CH_2)_m$ group, $O-CHCH_3-CH_2)_m$ group, $(O-CH_2-CH_2CH_2)_m$ group, $-O-(CH_2)_m$ group and $(CH_2)_m$ group, where m for $X_1$, $X_2$ in each case independently is an integer in the range from 1 to 100; and $Y_1$, $Y_2$ are independently selected from the group consisting of thio group, hydroxyl group and amino group;
(iii) a chain extender composition.

In a further preferred embodiment, the invention also relates to a process for preparing a polyurethane, in particular a thermoplastic polyurethane, comprising the reaction of the components (i) to (iii):
(i) a diisocyanate composition comprising at least 4,4'-MDI or HDI;
(ii) a polyol composition, comprising
  (ii.1) at least one polyether diol, preferably PTHF, or one polyester diol, wherein the polyether diol or polyester diol has a number-average molecular weight in the range from 500 to 3000 g/mol,
  (ii.2) at least one polysiloxane of general formula Ia

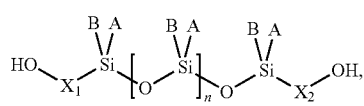

where n is an integer in the range from 10 to 20, A and B are both methyl groups; $X_1$ is a $(CH_2—CH_2O—)_m$ group, $X_2$ is an $(O—CH_2—CH_2)_m$ group, where m for $X_1$, $X_2$ in each case independently is an integer in the range from 3 to 15;

(iii) a chain extender composition comprising at least one diol or diamine selected from the group consisting of butane-1,4-diol, hexane-1,6-diol, ethane-1,2-diol and 2,4-diamino-3,5-di(methylthio)toluene.

In a further preferred embodiment, the invention also relates to a process for preparing a polyurethane, in particular a thermoplastic polyurethane, comprising the reaction of the components (i) to (iii):

(i) a diisocyanate composition comprising at least MDI;
(ii) a polyol composition, comprising
  (ii.1) at least one polyether diol, preferably PTHF, having a number-average molecular weight in the range from 500 to 3000 g/mol,
  (ii.2) at least one polysiloxane of general formula Ia

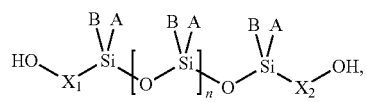

where n is an integer in the range from 10 to 20, A and B are both methyl groups; $X_1$ is a $(CH_2—CH_2—O—)_m$ group. $X_2$ is an $(O—CH_2—CH_2)_m$ group, where m for $X_1$, $X_2$ is identical and is an integer in the range from 3 to 15;

(iii) a chain extender composition comprising at least butane-1,4-diol.

In a further preferred embodiment, the invention also relates to a process for preparing a polyurethane, in particular a thermoplastic polyurethane, comprising the reaction of the components (i) to (iii):

(i) a diisocyanate composition comprising at least 4,4'-MDI;
(ii) a polyol composition, comprising
  (ii.1) at least one polyether diol, preferably PTHF, having a number-average molecular weight in the range from 500 to 3000 g/mol,
  (ii.2) at least one polysiloxane of general formula Ia

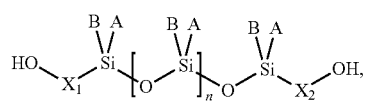

where n is an integer in the range from 10 to 20, A and B are both methyl groups; $X_1$ is a $(CH_2—CH_2O—)_m$ group, $X_2$ is an $(O—CH_2—CH_2)_m$ group, where m for $X_1$, $X_2$ is identical and is an integer in the range from 3 to 15;

(iii) a chain extender composition comprising at least hexane-1,6-diol.

In a further preferred embodiment, the invention also relates to processes for preparing a polyurethane, in particular a thermoplastic polyurethane, comprising the reaction of the components (i) to (iii):

(i) a diisocyanate composition comprising at least 4,4'-MDI;
(ii) a polyol composition, comprising
  (ii.1) at least one polyester diol having a number-average molecular weight $M_n$ in the range from 500 to 3000 g/mol,
  (ii.2) at least one polysiloxane of general formula Ia

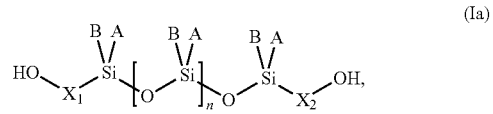

where n is an integer in the range from 10 to 20, A and B are both methyl groups; $X_1$ is a $(CH_2—CH_2—O—)_m$ group, $X_2$ is an $(O—CH_2—CH_2)_m$ group, where m for $X_1$, $X_2$ is identical and is an integer in the range from 3 to 15;

(iii) a chain extender composition comprising at least butane-1,4-diol.

In a further preferred embodiment, the invention also relates to a process for preparing a polyurethane, in particular a thermoplastic polyurethane, comprising the reaction of the components (i) to (iii):

(i) a diisocyanate composition comprising at least 4,4'-MDI;
(ii) a polyol composition, comprising
  (ii.1) at least one polyether diol, preferably PTHF, having a number-average molecular weight $M_n$ in the range from 500 to 3000 g/mol,
  (ii.2) at least one polysiloxane of general formula Ia

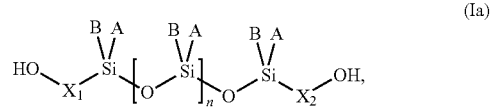

where n is an integer in the range from 10 to 20, A and u are both methyl groups; $X_1$ is a $(CH_2—CH_2—O—)_m$ group, $X_2$ is an $(O—CH_2—CH_2)_m$ group, where m for $X_1$, $X_2$ is identical and is an integer in the range from 3 to 15;

(iii) a chain extender composition comprising at least eth-ane-1,2-diol or 2,4-diamino-3,5-di(methylthio)toluene, preferably 2,4-diamino-3,5-di(methylthio)toluene.

In a preferred embodiment of the process for preparing a polyurethane, in particular a thermoplastic polyurethane, the method comprises the reaction of the components (i) to (iii) and additionally (iv) an antioxidant composition, where the antioxidant composition comprises at least one antioxidant selected from the sterically hindered phenols, preferably selected from the sterically hindered phenols having a tert-butyl group at least in the ortho position adjacent to the OH group, more preferably selected from the group consisting of ethylenebis(oxyethylene) bis(3-(5-tert-butyl-4-hydroxy-m-tolyl)propionate) (Irganox 245 FF, CAS number 36443-68-2), octadecyl 3-(3,5-di-tert-butyl-4-hydroxyphenyl)propionate (Irganox 1076, CAS number 2082-79-3), octyl 3,5-di-tert-butyl-4-hydroxyhydrocinnamate (Irganox 1135, CAS number 125643-61-0), N,N'-hexane-1,6-diylbis[3-(3,5-di-tert-butyl-4-hydroxyphenylpropionamide] (Irganox 1098, CAS number 23128-74-7), pentaerythritol tetrakis(3-(3,5-di-tert-butyl-4-hydroxyphenyl)propionate) (Irganox 1010, CAS number 6683-19-8) and 3,5-bis(tert-butyl)-4-hydroxytoluene (BHT, CAS number 128-37-0), more preferably selected from the group consisting of pentaerythritol tetrakis(3-(3,5-di-tert-butyl-4-hydroxyphenyl)propionate), N,N'-hexane-1,6-diylbis[3-(3,5-di-tert-butyl-4-hydroxyphenylpropionamide] and a mixture of pentaerythritol tetrakis(3-(3,5-di-tert-butyl-4-hydroxyphenyl)propionate) and N,N'-hexane-1,6-diylbis[3-(3,5-di-tert-butyl-4-hydroxyphenylpropionamide].

As regards preferred embodiments of the process, suitable feedstocks or mixing ratios, reference is made to the statements above which apply correspondingly.

The reaction of the components (i) to (iii) may in principle be conducted under reaction conditions known per se. The reaction may in this case be performed discontinuously or else continuously, for example in a belt process or a reactive extrusion process. Suitable processes are described for example in EP 0 922 552 A1 or WO 2006/082183 A1. In a preferred embodiment, the reaction of the components (i) to (iii) is conducted at temperatures higher than room temperature. According to the invention, the heating may be effected in any suitable manner known to those skilled in the art. According to the invention, it is also possible for the process to comprise further steps, for example a pretreatment of the components or an aftertreatment of the polyurethane, in particular the thermoplastic polyurethane, obtained, such as for example a heat treatment.

The present invention therefore further also relates to the use of a polyurethane, in particular a thermoplastic polyurethane, as described above or of a polyurethane, in particular a thermoplastic polyurethane, obtainable or obtained by the process according to the invention, for the production of a molded body, an injection-molded product, an extrusion product, or a film.

The properties of the inventive polyurethanes, in particular the thermoplastic polyurethanes, make them suitable for applications in various areas. The thermoplastic polyurethanes according to the invention by way of example have improved tactile properties and a hydrophobicity comparable to that of pure silicone plastics, which makes them particularly suitable for the use in consumer articles, preferably selected from the group consisting of items of clothing, especially footwear and footwear parts, especially midsoles, outsoles and shoelaces; jewelry and jewelry parts, especially for a smart device or monitoring electronics (especially for monitoring bodily functions such as heartbeat, temperature), preferably selected from the group consisting of wristbands, wristband parts, lanyards and lanyard parts, body straps and body strap parts, spectacles and spectacle parts; items of sports equipment, especially sport bands, resistance bands; damping materials; foam beads; woven articles; nonwoven articles; cleaning articles for mobile driving or flying devices, especially windshield wipers; medical articles, especially dressing articles or tubes. A smart device in this context is an electronic device which is wirelessly networked or networkable to another device or network, for example devices for consumer electronics, telephones, smartwatches.

The inventive polyurethanes, in particular the thermoplastic polyurethanes, when compared with standard TPUs not comprising any polysiloxane and having a comparable Shore A hardness, furthermore exhibit markedly improved mechanical properties, in particular improved elongation at break, tear strength and tensile strength, and abrasion is also significantly lower. This makes them likewise particularly suitable for applications in consumer articles as specified above, for example wristbands, but also in protective articles such as for example protective films and protective covers, especially cellphone cases, design elements for electrical components, for example laptop covers, iPad covers, loudspeakers, portable speakers.

Particular preference according to the invention is given to the use of the inventive polyurethanes, in particular the thermoplastic polyurethanes, for wristbands, wristband parts, lanyards and lanyard parts, body straps and body strap parts, especially for a smart device or for monitoring electronics. Particular preference is likewise given to the use for protective articles, preferably protective covers or protective films, more preferably cellphone cases.

Furthermore, the inventive polyurethanes, in particular the thermoplastic polyurethanes, have markedly improved heat resistance, thus their mechanical properties such as elongation at break are only slightly impaired even in the case of relatively long application of relatively high temperatures, which makes them particularly suitable for all types of articles that are exposed to heat, for example cable sheathings or conduits, such as for example in automobile accessories, especially automobile cable sheathings or conduits. It is of particular relevance here that the material remains dimensionally stable even in the case of relatively long action of heat and has an absolute elongation at break of at least 50% even after exposure to heat. Even inventive polyurethanes, in particular thermoplastic polyurethanes, having a low Shore A hardness (55A) exhibit only a minor deterioration in the elongation at break in the thermal aging—normal thermoplastic polyurethanes having Shore A hardnesses below 80 A melt within a few minutes during thermal aging.

The present invention therefore further also relates to the use as described above for an article selected from the group consisting of footwear, footwear parts, furniture parts, cushions, cushion parts, mattresses, mattress parts, transdermal systems, parts of a transdermal system, especially plasters, parts of a plaster, automobile accessories, especially automobile cable sheathings or conduits, jewelry, jewelry parts, especially wristbands, films, especially flooring films, ski films or protective films, and protective covers.

The invention further relates to an article comprising a polyurethane, in particular a thermoplastic polyurethane, as described above or a polyurethane, in particular a thermoplastic polyurethane, obtainable or obtained by a process as described above.

The present invention further provides particle foams based on the inventive polyurethane, obtained or obtainable from a polyurethane, in particular a thermoplastic polyurethane as described above. Particle foams (or bead foams, particle foam) and also molded bodies produced therefrom based on thermoplastic polyurethane or other elastomers are known (e.g. WO 94/20568 A1, WO 2007/082838 A1, WO 2017/030835 A1, WO 2013/153190 A1, WO 2010/010010 A1) and have manifold possible uses.

Particle foam or bead foam within the context of the present invention refers to a foam in bead form. The invention therefore likewise relates to a foam bead based on polyurethane, obtained or obtainable from a polyurethane, in particular a thermoplastic polyurethane as described above.

The terms "particle foam", "bead foam" and "foam bead" are used synonymously within the context of the present invention.

The average diameter of the particle foam/the foam bead is between 0.2 to 20, preferably 0.5 to 15 and in particular between 1 to 12 mm. For non-spherical, for example elongate or cylindrical particle foam, diameter means the longest dimension.

The inventive particle foams generally have a bulk density of from 50 g/l to 200 g/l, preferably 60 g/l to 180 g/l, particularly preferably 80 g/l to 150 g/l. The bulk density is measured analogously to DIN ISO 697, where, in contrast to the standard, the determination of the above values involves using a vessel having a 10 l volume instead of a vessel having a 0.5 l volume, since, especially for foam beads having low density and high mass, measurement using only 0.5 l volumes is too imprecise.

The term "foam beads" within the context of the present invention in one embodiment means foamed and/or expanded pellets having a diameter of greater than 1 mm.

For the production of a foam bead, preference is given to using polyurethane, in particular the thermoplastic polyurethane as described above, which has a hardness in the range Shore 30A to 98A or in the range Shore 40D to 64D, preferably a hardness in the range from Shore 30A to 95A, more preferably in the range from Shore 70A to 95A.

The foam beads can be obtained by impregnation of the polyurethane, in particular the thermoplastic polyurethane, as described above, with a blowing agent in suspension/in an autoclave or by means of melt impregnation of molten thermoplastic polyurethane with a blowing agent and subsequent pelletization. Suitable processes for producing the foam beads based on thermoplastic elastomers are described for example in WO 2005/023920 A1, WO 2007/082838 A1, WO 2013/153190 A1 and WO 2014/198779 A1.

The particle foams can be produced by the standard processes known in the prior art by
i. providing the inventive polyurethane, in particular the thermoplastic polyurethane, as described above;
ii. impregnating the polyurethane, in particular the thermoplastic polyurethane, as described above, with a blowing agent under pressure;
iii. expanding the polyurethane, in particular the thermoplastic polyurethane, as described above, by means of pressure decrease.

The amount of blowing agent is preferably 0.1 to 40, in particular 0.5 to 35 and particularly preferably 1 to 30 parts by weight, based on 100 parts by weight of the employed amount of the polyurethane, in particular of the thermoplastic polyurethane, as described above.

One embodiment of the abovementioned process comprises
i. providing the inventive polyurethane, in particular the thermoplastic polyurethane, as described above, in the form of pellets;
ii. impregnating the pellets with a blowing agent under pressure;
iii. expanding the pellets by means of pressure decrease.

A further embodiment of the abovementioned process comprises a further step:
i. providing the inventive polyurethane, in particular the thermoplastic polyurethane, as described above, in the form of pellets;
ii. impregnating the pellets with a blowing agent under pressure;
iii. reducing the pressure to standard pressure without foaming the pellets, optionally via prior temperature reduction;
iv. foaming the pellets via temperature increase.

It is preferable for the pellets to have an average minimal diameter of 0.2-10 mm here (determined by way of 3D evaluation of the pellets, for example by way of dynamic image analysis with use of a PartAn 3D optical measuring apparatus from Microtrac).

The individual pellets generally have an average mass in the range from 0.1 to 50 mg, preferably in the range from 4 to 40 mg and particularly preferably in the range from 7 to 32 mg. This average mass of the pellets (particle weight) is determined as the arithmetic average by means of three weighing operations of in each case 10 pellet particles.

One embodiment of the abovementioned process comprises impregnating the pellets with a blowing agent under pressure and subsequently expanding the pellets in steps (ii) and (iii):
ii. impregnating the pellets in the presence of a blowing agent under pressure at elevated temperatures in a suitable, closed reaction vessel (e.g. autoclave)
iii. abruptly depressurizing without cooling.

The impregnation in step ii) here can take place in the presence of water and also optionally suspension auxiliaries, or solely in the presence of the blowing agent and in the absence of water.

Suitable suspension auxiliaries are, for example, water-insoluble inorganic stabilizers, such as tricalcium phosphate, magnesium pyrophosphate, metal carbonates; and also polyvinyl alcohol and surfactants, such as sodium dodecylarylsulfonate. These are usually used in amounts of from 0.05% to 10% by weight, based on the inventive polyurethane, in particular the thermoplastic polyurethane, as described above.

Depending on the chosen pressure, the impregnation temperatures are in the range from 100-200° C., the pressure in the reaction vessel being from 2-150 bar, preferably between 5 and 100 bar, particularly preferably between 20 and 60 bar, the impregnation time being generally from 0.5 to 10 hours.

Carrying out the process in suspension is known to those skilled in the art and has been described, by way of example, extensively in WO 2007/082838 A1.

When carrying out the process in the absence of the blowing agent, care must be taken to avoid aggregation of the polymer pellets.

Suitable blowing agents for carrying out the process in a suitable closed reaction vessel are by way of example organic liquids and gases which are in a gaseous state under the processing conditions, such as hydrocarbons or inorganic gases or mixtures of organic liquids or gases with inorganic gases, where these may also be combined.

Examples of suitable hydrocarbons are halogenated or non-halogenated, saturated or unsaturated aliphatic hydrocarbons, preferably non-halogenated, saturated or unsaturated aliphatic hydrocarbons.

Preferred organic blowing agents are saturated, aliphatic hydrocarbons, in particular those having 3 to 8 carbon atoms, for example butane or pentane.

Suitable inorganic gases are nitrogen, air, ammonia or carbon dioxide, preferably nitrogen or carbon dioxide, or mixtures of the abovementioned gases.

In a further embodiment, the impregnation of the pellets with a blowing agent under pressure and subsequent expansion of the pellets in step (ii) and (iii) comprises:
ii. impregnating the pellets in the presence of a blowing agent under pressure at elevated temperatures in an extruder
iii. pelletizing the composition emerging from the extruder under conditions that prevent uncontrolled foaming.

Suitable blowing agents in this process version are volatile organic compounds having a boiling point at standard pressure 1013 mbar of from −25 to 150° C., in particular −10 to 125° C. Materials with good suitability are hydrocarbons (preferably halogen-free), in particular C4-10-alkanes, for example the isomers of butane, of pentane, of hexane, of heptane, and of octane, particularly preferably isopentane.

Further possible blowing agents are moreover sterically more demanding compounds or functionalized hydrocarbons such as alcohols, ketones, esters, ethers and organic carbonates.

In this case the polyurethane, in particular the thermoplastic polyurethane, as described above, in step (ii) in an extruder while melting is mixed under pressure with the blowing agent, which is supplied to the extruder. The mixture comprising blowing agent is extruded and pelletized under pressure, preferably using counterpressure controlled to a moderate level (e.g. underwater pelletization). The melt strand foams in the process, and pelletization gives the particle foams.

Carrying out the process via extrusion is known to those skilled in the art and has been described, by way of example, extensively in WO2007/082838 A1, and also in WO 2013/153190 A1.

Extruders that can be used are any of the conventional screw-based machines, in particular single-screw and twin-screw extruders (e.g. ZSK type from Werner & Pfleiderer), co-kneaders, Kombiplast machines, MPC kneading mixers, FCM mixers, KEX kneading screw-extruders and shear-roll extruders, as have been described by way of example in Saechtling (ed.), Kunststoff-Taschenbuch [Plastics Handbook], 27th edition, Hanser-Verlag, Munich 1998, chapters 3.2.1 and 3.2.4. The extruder is usually operated at a temperature at which the MATERIAL is present as a melt, for example at 120° C. to 250° C., in particular 150 to 210° C., and at a pressure, after addition of the blowing agent, of 40 to 200 bar, preferably 60 to 150 bar, particularly preferably 80 to 120 bar, in order to ensure homogenization of the blowing agent with the melt.

The process here can be conducted in an extruder or in an arrangement composed of one or more extruders. Thus, by way of example, the components can be melted and blended, and a blowing agent injected, in a first extruder. In the second extruder, the impregnated melt is homogenized and the temperature and/or the pressure is adjusted. If, by way of example, three extruders are combined with one another, the mixing of the components and the injection of the blowing agent can also be split between two different process sections. If, as is preferred, only one extruder is used, all of the process steps—melting, mixing, injection of the blowing agent, homogenization and adjustment of the temperature and/or of the pressure—are carried out in a single extruder.

As an alternative and in accordance with the methods described in WO2014/150122 A1 or WO2014/150124 A1, the corresponding particle foam, which is optionally even already colored, can be produced directly from the pellets in that the corresponding pellets are saturated with a supercritical liquid, are removed from the supercritical liquid, followed by
(a) immersing the article in a heated fluid or
(b) irradiating the article with energetic radiation (e.g. infrared or microwave irradiation).

Examples of suitable supercritical liquids are those described in WO2014/150122 A1, e.g. carbon dioxide, nitrogen dioxide, ethane, ethylene, oxygen or nitrogen, preferably carbon dioxide or nitrogen.

The supercritical liquid here can also comprise a polar liquid with a Hildebrand solubility parameter equal to or greater than 9 $MPa^{1/2}$.

The supercritical fluid or the heated fluid may also comprise a colorant here, thus obtaining a colored, foamed article.

In one embodiment, the invention relates to a process for producing foam beads, wherein a polyurethane, in particular a thermoplastic polyurethane, as described above is melted, admixed with a blowing agent, and the blowing agent-containing melt is pelletized while being foamed.

This is preferably effected at a pressure in the range from 1 to 15 bar, more preferably at a pressure in the range from 5 to 15 bar. An extrusion process is preferably used. The invention also relates in one embodiment to a process for producing foam beads, wherein a polyurethane, in particular a thermoplastic polyurethane, as described above is expanded in the presence of a blowing agent at a pressure in the range from 1 to 15 bar, preferably in the range from 1 to 5 bar. This process is preferably effected in a closed system, or preferably in an autoclave (tank process).

The present invention further provides a molded body produced from the particle foams according to the invention.

The corresponding molded bodies can be produced by methods known to those skilled in the art.

A process preferred here for the production of a foam molding comprises the following steps:
(x) introducing the inventive particle foams into an appropriate mold,
(y) fusing the inventive particle foams from step (x).

The fusion in step (y) is preferably effected in a closed mold, wherein the fusing can be effected by means of gases such as water vapor, hot air (as described for example in EP 1 979 401 B1) or energetic radiation (microwaves or radio waves).

The temperature during the fusing of the particle foam is preferably below or close to the melting temperature of the polymer from which the particle foam was produced. For commonly used polymers, the temperature for the fusion of the particle foam is accordingly between 100° C. and 180° C., preferably between 120 and 150° C.

Temperature profiles/residence times can be ascertained individually here, for example in analogy to the processes described in US 2015/0337102 or EP 2 872 309 B1.

The fusion by way of energetic radiation generally takes place in the frequency range of microwaves or radio waves, optionally in the presence of water or of other polar liquids, for example microwave-absorbing hydrocarbons having polar groups (such as for example esters of carboxylic acids and of diols or of triols, or glycols and liquid polyethylene glycols), and can be effected in analogy to the processes described in EP 3 053 732 A1 or WO 2016/146537 A1.

The invention relates in one embodiment to bead foams obtainable by fusing foam beads as described above or foam beads obtained or obtainable by the process as described above by means of water vapor or irradiation with energetic radiation in the region from 1 kHz to 1 THz, preferably of electromagnetic radiation, in particular radiation in the radiofrequency range (9 kHz to 1 THz).

The invention further relates to bead foams obtainable by adhesively bonding foam beads as described above or foam beads obtained or obtainable by the process as described above using adhesives.

As stated above, the particle foam can also comprise colorants. Colorants can be added here in various ways.

In one embodiment, the particle foams produced can be colored after production. In this case, the corresponding particle foams are brought into contact with a carrier liquid comprising a colorant, where the carrier liquid (CL) has a polarity that is suitable for sorption of the carrier liquid into the particle foam to occur. This can be carried out in analogy to the methods described in the EP application having application Ser. No. 17/198,591.4.

Examples of suitable colorants are inorganic or organic pigments. Examples of suitable natural or synthetic inorganic pigments are carbon black, graphite, titanium oxides, iron oxides, zirconium oxides, cobalt oxide compounds, chromium oxide compounds, copper oxide compounds.

Examples of suitable organic pigments are azo pigments and polycyclic pigments.

In a further embodiment, the color can be added during production of the particle foam. By way of example, the colorant can be added into the extruder during production of the particle foam by way of extrusion.

As an alternative, material that has already been colored can be used as starting material for the production of the particle foam, this being extruded or being expanded in the closed vessel by the processes mentioned above.

In addition, in the process described in WO 2014/150122 A1, the supercritical liquid or the heated liquid may comprise a colorant.

There is a relationship between the density and compression properties of the molded bodies produced. The density of the moldings produced is advantageously from 75 to 375 kg/m³, preferably from 100 to 300 kg/m³, particularly preferably from 150 to 200 kg/m³ (DIN EN ISO 845, October 2009).

The ratio of the density of the molding to the bulk density of the particle foams of the invention here is generally between 1.5 and 2.5, preferably 1.8 to 2.0.

The properties of the inventive foam beads/the bead foams make them suitable for applications in various areas.

The invention in one embodiment provides for the use of an inventive particle foam for the production of a molded body for shoe intermediate soles, shoe insoles, shoe combisoles, bicycle saddles, bicycle tires, damping elements, cushioning, mattresses, underlays, grips, protective films, in components in automobile interiors and exteriors, in balls and sports equipment or as floor covering, especially for sports surfaces, track and field surfaces, sports halls, children's playgrounds and pathways.

In one embodiment, the foam beads are used for applications in the fields of sport, clothing, construction, automobiles, electronics. The foam beads/bead foams according to the invention by way of example have improved dirt repellency, which makes them particularly suitable for the use in consumer articles, preferably selected from the group consisting of items of clothing, especially footwear and footwear parts, especially midsoles and outsoles; jewelry and jewelry parts, especially for a smart device or monitoring electronics (especially for monitoring bodily functions such as heartbeat, temperature), preferably selected from the group consisting of wristbands, wristband parts, lanyards and lanyard parts, body straps and body strap parts, spectacles and spectacle parts; items of sports equipment, especially sport bands, resistance bands; damping materials; cleaning articles for mobile driving or flying devices, especially windshield wipers; medical articles. A smart device in this context is an electronic device which is wirelessly networked or networkable to another device or network, for example devices for consumer electronics, telephones, smartwatches.

The present invention is illustrated in more detail by the following embodiments and combinations of embodiments, which are apparent from the corresponding dependency references and other references. In particular, it should be noted that in every case where a range of embodiments is mentioned, for example in the context of an expression such as "the process according to any of embodiments 1 to 4", each embodiment in this range is deemed to be explicitly disclosed to those skilled in the art, i.e. the wording of this expression is to be understood by those skilled in the art as synonymous with "the process according to any of embodiments 1, 2, 3, and 4".

1. A polyurethane, in particular thermoplastic polyurethane, obtainable or obtained by reacting at least the components (i) to (ii):
   (i) a polyisocyanate composition;
   (ii) a polyol composition, comprising
      (ii.1) at least one polyester diol or polyether diol having a number-average molecular weight in the range from 500 to 3000 g/mol,
      (ii.2) at least one polysiloxane having two terminal isocyanate-reactive functionalities selected from the group consisting of thio group, hydroxyl group and amino group.

2. A polyurethane, in particular thermoplastic polyurethane, obtainable or obtained by reacting at least the components (i) to (iii):
   (i) a polyisocyanate composition;
   (ii) a polyol composition, comprising
      (ii.1) at least one polyester diol or polyether diol having a number-average molecular weight in the range from 500 to 3000 g/mol,
      (ii.2) at least one polysiloxane having two terminal isocyanate-reactive functionalities selected from the group consisting of thio group, hydroxyl group and amino group;
   (iii) a chain extender composition.

3. The polyurethane, in particular thermoplastic polyurethane, according to embodiment 1 or 2, having a melt mass-flow rate, determined according to DIN EN ISO 1133 (March 2012 version) and measured at a temperature in the range from 190 to 220° C. and at a mass in the range from 1 to 30 kg, in the range from 20 to 350 g/10 min.

4. The polyurethane, in particular thermoplastic polyurethane, according to any of embodiments 1 to 3, obtainable or obtained by reacting at least the components (i) to (iii):
   (i) a polyisocyanate composition;
   (ii) a polyol composition, comprising
      (ii.1) at least one polyester diol or polyether diol having a number-average molecular weight in the range from 500 to 3000 g/mol,
      (ii.2) at least one polysiloxane of general formula I

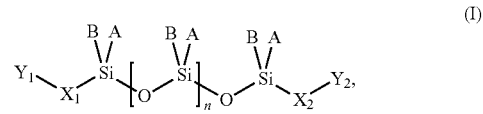

(I)

where n is an integer in the range from 1 to 250, A and B are independently selected from the group of the C1-C20-alkyl groups; $X_1$ is selected from the group consisting of $(CH_2-CH_2-O)_m$ group, $(CH_2-CH_2-CH_2-O)_m$ group, $(CH_2-CHCH_3-O)_m$ group, $(CH_2)_m-O$ group and $(CH_2)_m$ group, $X_2$ is selected from the group consisting of $(O-CH_2-CH_2)_m$ group, $(O-CHCH_3-CH_2)_m$ group, $(O-CH_2-CH_2-CH_2)_m$ group, $O-(CH_2)_m$ group and $-(CH_2)_m$ group, where m for $X_1$, $X_2$ in each case independently is an integer in the range from 1 to 100; and $Y_1$, $Y_2$ are independently selected from the group consisting of thio group, hydroxyl group and amino group;
   (iii) a chain extender composition.

5. The polyurethane, in particular thermoplastic polyurethane, according to any of embodiments 1 to 4, obtainable or obtained by reacting at least the components (i) to (iii):
   (i) a diisocyanate composition;
   (ii) a polyol composition, comprising
      (ii.1) at least one dihydric polyester diol or polyether diol having a number-average molecular weight in the range from 500 to 3000 g/mol,
      (ii.2) at least one polysiloxane of general formula I

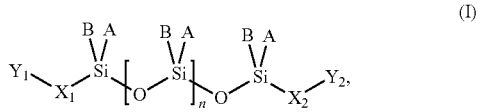 (I)

where n is an integer in the range from 1 to 250, A and B are independently selected from the group of the C1-C20-alkyl groups; $X_1$ is selected from the group consisting of $(CH_2-CH_2-O)_m$ group, $(CH_2-CH_2-CH_2-O)_m$ group, $(CH_2-CHCH_3-O)_m$ group, $(CH_2)_m-O$ group and $(CH_2)_m$ group, $X_2$ is selected from the group consisting of $(O-CH_2-CH_2)_m$ group, $(O-CHCH_3-CH_2)_m$ group, $(O-CH_2-CH_2-CH_2)_m$ group, $O-(CH_2)_m$ group and $-(CH_2)_m$ group, where m for $X_1$, $X_2$ in each case independently is an integer in the range from 1 to 100; and $Y_1$, $Y_2$ are independently selected from the group consisting of thio group, hydroxyl group and amino group;
   (iii) a chain extender composition.
6. The polyurethane, in particular thermoplastic polyurethane, according to embodiment 4 or 5, wherein the index n of the at least one polysiloxane as per (ii.2) is an integer in the range from 3 to 50 or in the range from 100 to 240.
7. The polyurethane, in particular thermoplastic polyurethane, according to any of embodiments 4 to 6, wherein A and B of the polysiloxane as per (ii.2) are independently selected from the group of the C1- to C5-alkyl groups, preferably A and B are each identical and are selected from the group of the C1- to C5-alkyl groups, wherein more preferably A and B are both a methyl group.
8. The polyurethane, in particular thermoplastic polyurethane, according to any of embodiments 4 to 7, wherein the index m for $X_1$, $X_2$ of the polysiloxane as per (ii.2) in each case independently is an integer in the range from 1 to 50, preferably in the range from 1 to 20, more preferably in the range from 1 to 15.
9. The polyurethane, in particular thermoplastic polyurethane, according to any of embodiments 4 to 8, wherein $Y_1$ and $Y_2$ of the polysiloxane as per (ii.2) are both a hydroxyl group or both an amino group.
10. The polyurethane, in particular thermoplastic polyurethane, according to any of embodiments 4 to 9, wherein $X_1$ of the polysiloxane as per (ii.2) is a $(CH_2-CH_2-O)_m$ group or a $(CH_2-CH_2-CH_2-O)_m$ group or a $(CH_2-CHCH_3-O)_m$ group, $X_2$ of the polysiloxane as per (ii.2) is an $(O-CHCH_3-CH_2)_m$ group or an $(O-CH_2-CH_2)_m$ group or an $(O-CH_2-CH_2-CH_2)_m$ group, where m for $X_1$, $X_2$ in each case independently is an integer in the range from 2 to 20; and $Y_1$ and $Y_2$ are both a hydroxyl group.
11. The polyurethane, in particular thermoplastic polyurethane, according to any of embodiments 4 to 10, wherein the index n of the at least one polysiloxane as per (ii.2) is an integer in the range from 3 to 50, preferably in the range from 5 to 40, more preferably in the range from 10 to 20; $X_1$ of the polysiloxane as per (ii.2) is a $(CH_2-CH_2-O)_m$ group, $X_2$ of the polysiloxane as per (ii.2) is an $(O-CH_2-CH_2)_m$ group, where m for $X_1$, $X_2$ in each case independently is an integer in the range from 2 to 20, more preferably in the range from 3 to 15; and $Y_1$ and $Y_2$ are both a hydroxyl group.
12. The polyurethane, in particular thermoplastic polyurethane, according to any of embodiments 4 to 10, wherein the index n of the at least one polysiloxane as per (ii.2) is an integer in the range from 100 to 240, preferably in the range from 110 to 235; $X_1$ and $X_2$ of the polysiloxane as per (ii.2) are both a $(CH_2)_m$ group, where m is an integer in the range from 1 to 50, more preferably in the range from 2 to 10, more preferably in the range from 2 to 5, more preferably is 3, and $Y_1$, $Y_2$ of the polysiloxane as per (ii.2) are both an amino group.
13. The polyurethane, in particular thermoplastic polyurethane, according to any of embodiments 4 to 10, wherein the index n of the at least one polysiloxane as per (ii.2) is an integer in the range from 3 to 50, more preferably in the range from 20 to 40; $X_1$ and $X_2$ of the polysiloxane as per (ii.2) are both a $(CH_2)_m$ group, where m is an integer in the range from 1 to 50, more preferably in the range from 2 to 10, more preferably in the range from 2 to 5, more preferably is 3, and $Y1$, $Y_2$ of the polysiloxane as per (ii.2) are both an amino group.
14. The polyurethane, in particular thermoplastic polyurethane, according to any of embodiments 4 to 10, wherein the index n of the at least one polysiloxane as per (ii.2) is an integer in the range from 3 to 50, preferably in the range from 10 to 30; $X_1$ and $X_2$ of the polysiloxane as per (ii.2) are both a $(CH_2)_m$ group, where m is an integer in the range from 1 to 20, preferably in the range from 1 to 10, more preferably is 1, and $Y_1$, $Y_2$ of the polysiloxane as per (ii.2) are both a hydroxyl group.
15. The polyurethane, in particular thermoplastic polyurethane, according to any of embodiments 2 to 14, wherein the chain extender composition as per (iii) comprises at least one compound having at least two isocyanate-reactive functional groups, preferably two isocyanate-reactive functional groups, where the isocyanate-reactive functional groups are preferably selected from the group of hydroxyl group, amino group and thiol group.
16. The polyurethane, in particular thermoplastic polyurethane, according to embodiment 15, wherein the at least one compound having isocyanate-reactive functional groups is selected from the group consisting of ethane-1,2-diol, butane-1,4-diol, hexane-1,6-diol and 2,4-diamino-3,5-di(methylthio)toluene, and is preferably butane-1,4-diol.
17. The polyurethane, in particular thermoplastic polyurethane, according to any of embodiments 1 to 16, wherein the at least one polysiloxane as per (ii.2) is present in a proportion in the range from 0.1% to 50% by weight, preferably in the range from 1% to 30% by weight, more preferably in the range from 5% to 20% by weight, based on the total weight of all of components (ii.1) and (ii.2).
18. The polyurethane, in particular thermoplastic polyurethane, according to any of embodiments 1 to 17, wherein the polyester diol or polyether diol as per (ii.1) is selected from the group of the dihydric polyester diols and polyether diols, preferably from the group consisting of polyethylene glycol, polypropylene glycol, polyadipates, polycarbonates/polycarbonate diols and polycaprolactones and polytetrahydrofuran (PTHF), preferably from the group of polyester diols and PTHF, where the polyester diol is preferably formed from adipic acid, butane-1,4-diol and hexane-1,6-diol; more preferably PTHF, where the PTHF preferably has a number-average molecular weight Mn in the range from 500 to 3000 g/mol, preferably in the range from 1000 to 2000 g/mol.

19. The polyurethane, in particular thermoplastic polyurethane, according to any of embodiments 1 to 18, wherein the polyisocyanate composition as per (i) comprises at least one polyisocyanate selected from the diisocyanates, preferably selected from the group consisting of diphenylmethane 2,2'-diisocyanate (2,2'-MDI), diphenylmethane 2,4'-diisocyanate (2,4'-MDI), diphenylmethane 4,4'-diisocyanate (4,4'-MDI), hexamethylene 1,6-diisocyanate (HDI) and methylene dicyclohexyl 4,4'-, 2,4'- and 2,2'-diisocyanate (H12MDI).

20. The polyurethane, in particular thermoplastic polyurethane, according to any of embodiments 2 to 19, wherein the polyurethane has a hard segment content in the range from 10% to 50% by weight, preferably from 17% to 30% by weight, based on the total weight of all of components (i), (ii), (iii).

21. The polyurethane, in particular thermoplastic polyurethane, according to any of embodiments 2 to 20, wherein the polyurethane has a hardness in the range from Shore 30AA to 98A or in the range from Shore 40D to 64D, preferably in the range from Shore 30A to 95A, more preferably in the range from Shore 70A to 95A.

22. The polyurethane, in particular thermoplastic polyurethane, according to any of embodiments 1 to 21, obtainable or obtained by reacting at least the components (i) to (iii):
(i) a diisocyanate composition comprising at least 4,4'-MDI or HDI;
(ii) a polyol composition, comprising
 (ii.1) at least one polyether diol, preferably PTHF, or one polyester diol, wherein the polyether diol or polyester diol has a number-average molecular weight $M_n$ in the range from 500 to 3000 g/mol,
 (ii.2) at least one polysiloxane of general formula Ia

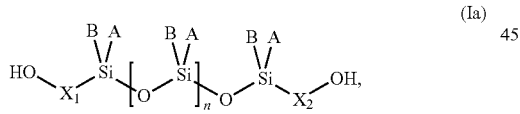

where n is an integer in the range from 10 to 20, A and B are both methyl groups; $X_1$ is a ($CH_2$—$CH_2$—O—)$_m$ group, $X_2$ is an (O—$CH_2$—$CH_2$)$_m$ group, where m for $X_1$, $X_2$ in each case independently is an integer in the range from 3 to 15;
(iii) a chain extender composition comprising at least one diol or diamine selected from the group consisting of butane-1,4-diol, hexane-1,6-diol, ethane-1,2-diol and 2,4-diamino-3,5-di(methyfthio)toluene.

23. The polyurethane, in particular thermoplastic polyurethane, according to any of embodiments 1 to 22, obtainable or obtained by reacting at least the components (i) to (iii):
(i) a diisocyanate composition comprising at least MDI;
(ii) a polyol composition, comprising
 (ii.1) at least one polyether diol, preferably PTHF, having a number-average molecular weight $M_n$ in the range from 500 to 3000 g/mol,
 (ii.2) at least one polysiloxane of general formula Ia

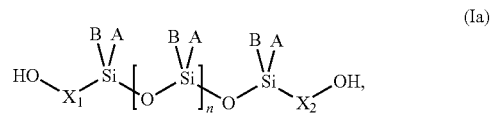

where n is an integer in the range from 10 to 20, A and B are both methyl groups; $X_1$ is a ($CH_2$—$CH_2$—O—)$_m$ group, $X_2$ is an (O—$CH_2$—$CH_2$)$_m$ group, where m for $X_1$, $X_2$ is identical and is an integer in the range from 3 to 15;
(iii) a chain extender composition comprising at least butane-1,4-diol.

24. The polyurethane, in particular thermoplastic polyurethane, according to embodiment 23, having a melt mass-flow rate, determined according to DIN EN ISO 1133 (March 2012 version) and measured at a temperature of 190° C. and 21.6 kg, in the range from 20 to 350 g/10 min, preferably in the range from 35 to 90 g/10 min, more preferably in the range from 40 to 85 g/10 min.

25. The polyurethane, in particular thermoplastic polyurethane, according to any of embodiments 1 to 22, obtainable or obtained by reacting at least the components (i) to (iii):
(i) a diisocyanate composition comprising at least HDI;
(ii) a polyol composition, comprising
 (ii.1) at least one polyether diol having a number-average molecular weight $M_n$ in the range from 500 to 3000 g/mol,
 (ii.2) at least one polysiloxane of general formula Ia

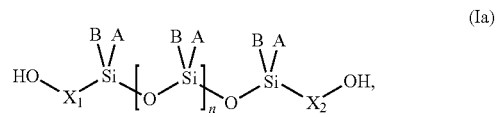

where n is an integer in the range from 10 to 20, A and B are both methyl groups; $X_1$ is a ($CH_2$—$CH_2$—O—)$_m$ group, $X_2$ is an (O—$CH_2$—$CH_2$)$_m$ group, where m for $X_1$, $X_2$ is identical and is an integer in the range from 3 to 15;
(iii) a chain extender composition comprising at least hexane-1,6-diol.

26. The polyurethane, in particular thermoplastic polyurethane, according to embodiment 25, having a melt mass-flow rate, determined according to DIN EN ISO 1133 (March 2012 version) and measured at a temperature of 190° C. and 3.8 kg, in the range from 20 to 350 g/10 min, preferably in the range from 28 to 220 g/10 min, more preferably in the range from 28 to 215 g/10 min.

27. The polyurethane, in particular thermoplastic polyurethane, according to any of embodiments 1 to 22, obtainable or obtained by reacting at least the components (i) to (iii):
(i) a diisocyanate composition comprising at least 4,4'-MDI;
(ii) a polyol composition, comprising
 (ii.1) at least one polyester diol having a number-average molecular weight $M_n$ in the range from 500 to 3000 g/mol, (ii.2) at least one polysiloxane of general formula Ia

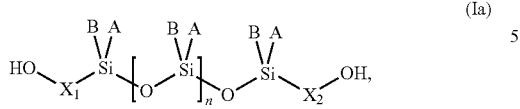

(Ia)

where n is an integer in the range from 10 to 20, A and B are both methyl groups; $X_1$ is a $(CH_2-CH_2-O-)_m$ group, $X_2$ is an $(O-CH_2-CH_2)_m$ group, where m for $X_1$, $X_2$ is identical and is an integer in the range from 3 to 15;

(iii) a chain extender composition comprising at least butane-1,4-diol.

28. The polyurethane, in particular thermoplastic polyurethane, according to embodiment 27, having a melt mass-flow rate, determined according to DIN EN ISO 1133 (March 2012 version) and measured at a temperature of 220° C. and 2.16 kg, in the range from 20 to 350 g/10 min. preferably in the range from 60 to 120 g/10 min, more preferably in the range from 65 to 105 g/10 min.

29. The polyurethane, in particular thermoplastic polyurethane, according to any of embodiments 1 to 22, obtainable or obtained by reacting at least the components (i) to (iii):
(i) a diisocyanate composition comprising at least 4,4'-MDI;
(ii) a polyol composition, comprising
    (ii.1) at least one polyether diol, preferably PTHF, having a number-average molecular weight $M_n$ in the range from 500 to 3000 g/mol,
    (ii.2) at least one polysiloxane of general formula Ia

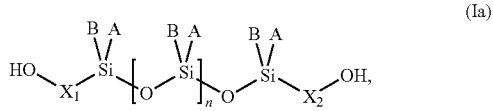

(Ia)

where n is an integer in the range from 10 to 20, A and B are both methyl groups; $X_1$ is a $(CH_2-CH_2-O-)_m$ group, $X_2$ is an $(O-CH_2-CH_2)_m$ group, where m for $X_1$, $X_2$ is identical and is an integer in the range from 3 to 15;

(iii) a chain extender composition comprising at least ethane-1,2-diol or 2,4-diamino-3,5-di(methythio)toluene, preferably 2,4-diamino-3,5-di(methylthio)toluene.

30. The polyurethane, in particular thermoplastic polyurethane, according to embodiment 29, having a melt mass-flow rate, determined according to DIN EN ISO 1133 (March 2012 version) and measured at a temperature of 190° C. and 10 kg, in the range from 20 to 350 g/10 min, preferably in the range from 75 to 350 g/10 min, more preferably in the range from 85 to 340 g/10 min.

31. The polyurethane, in particular thermoplastic polyurethane, according to any of embodiments 1 to 30, obtainable or obtained by reacting at least the components (i) to (iii) and additionally
(iv) an antioxidant composition, where the antioxidant composition comprises at least one antioxidant selected from the sterically hindered phenols, preferably selected from the sterically hindered phenols having a tert-butyl group at least in the ortho position adjacent to the OH group, more preferably selected from the group consisting of ethylenebis(oxyethylene) bis(3-(5-tert-butyl-4-hydroxy-m-tolyl)propionate) (Irganox 245 FF. CAS number 36443-68-2), octadecyl 3-(3,5-di-tert-butyl-4-hydroxyphenyl)propionate (Irganox 1076, CAS number 2082-79-3), octyl 3,5-di-tertbutyl-4-hydroxyhydrocinnamate (Irganox 1135, CAS number 125643-61-0), N,N'-hexane-1,6-diylbis[3-(3,5-di-tert-butyl-4-hydroxyphenylpropionamide] (Irganox 1098, CAS number 23128-74-7), pentaerythritol tetrakis(3-(3,5-di-tert-butyl-4-hydroxyphenyl)propionate) (Irganox 1010, CAS number 6683-19-8) and 3,5-bis(tertbutyl)-4-hydroxytoluene (BHT, CAS number 128-37-0), more preferably selected from the group consisting of pentaerythritol tetrakis(3-(3,5-di-tert-butyl-4-hydroxyphenyl)propionate), N,N'-hexane-1,6-diylbis[3-(3,5-di-tert-butyl-4-hydroxyphenylpropionamide] and a mixture of pentaerythritol tetrakis(3-(3,5-di-tert-butyl-4-hydroxyphenyl)propionate) and N,N'-hexane-1,6-diylbis[3-(3,5-di-tert-butyl-4-hydroxyphenylpropionamide].

32. A process for preparing a polyurethane, in particular a thermoplastic polyurethane, comprising the reaction of the components (i) to (ii):
(i) a polyisocyanate composition;
(ii) a polyol composition, comprising
    (ii.1) at least one polyester diol or polyether diol having a number-average molecular weight in the range from 500 to 3000 g/mol,
    (ii.2) at least one polysiloxane having two terminal isocyanate-reactive functionalities selected from the group consisting of thio group, hydroxyl group and amino group.

33. A process for preparing a polyurethane, in particular a thermoplastic polyurethane, comprising the reaction of the components (i) to (iii):
(i) a polyisocyanate composition;
(ii) a polyol composition, comprising
    (ii.1) at least one polyester diol or polyether diol having a number-average molecular weight in the range from 500 to 3000 g/mol,
    (ii.2) at least one polysiloxane having two terminal isocyanate-reactive functionalities selected from the group consisting of thio group, hydroxyl group and amino group:
(iii) a chain extender composition.

34. The process for preparing a polyurethane, in particular a thermoplastic polyurethane, according to embodiment 32 or 33, comprising the reaction of the components (i) to (iii):
(i) a polyisocyanate composition;
(ii) a polyol composition, comprising
    (ii.1) at least one polyester diol or polyether diol having a number-average molecular weight in the range from 500 to 3000 g/mol,
    (ii.2) at least one polysiloxane of general formula I

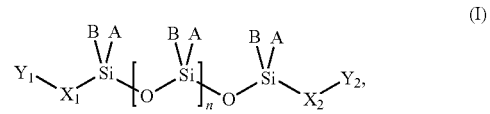

(I)

where n is an integer in the range from 1 to 250, A and B are independently selected from the group of the C1-C20-alkyl groups; $X_1$ is selected from the group consisting of $(CH_2-CH_2O-)_m$ group, (CH₂—CH₂—CH₂—O)ₘ group, (CH₂—CHCH₃—O)ₘ group, (CH₂)ₘ—O group and (CH₂)ₘ group, X₂ is selected from the group consisting of (O—CH₂—CH₂)ₘ group, (O—CHCH₃—CH₂)ₘ group, (O—CH₂—CH₂—CH₂)ₘ group, —O—(CH₂)ₘ group and —(CH₂)ₘ group, where m for X₁, X₂ in each case independently is an integer in the range from 1 to 100; and Y₁, Y₂ are independently selected from the group consisting of thio group, hydroxyl group and amino group;

(iii) a chain extender composition.

35. The process for preparing a polyurethane, in particular a thermoplastic polyurethane, according to any of embodiments 32 to 34, comprising the reaction of the components (i) to (ii):
(i) a diisocyanate composition;
(ii) a polyol composition, comprising
    (ii.1) at least one dihydric polyester diol or polyether diol having a number-average molecular weight in the range from 500 to 3000 g/mol,
    (ii.2) at least one polysiloxane of general formula I

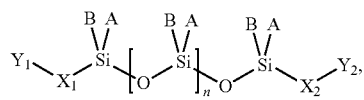

(I)

where n is an integer in the range from 1 to 250, A and B are independently selected from the group of the C1-C20-alkyl groups; X₁ is selected from the group consisting of (CH₂—CH₂—O—)ₘ group, (CH₂—CH₂—CH₂—O)ₘ group, (CH₂—CHCH₃—O)ₘ group, (CH₂)ₘ—O group and (CH₂)ₘ group, X₂ is selected from the group consisting of (O—CH₂—CH₂)ₘ group, (O—CHCH₃—CH₂)ₘ group, (O—CH₂—CH₂—CH₂)ₘ group, —O—(CH₂)ₘ group and —(CH₂)ₘ group, where m for X₁, X₂ in each case independently is an integer in the range from 1 to 100; and Y₁, Y₂ are independently selected from the group consisting of thio group, hydroxyl group and amino group;

(iii) a chain extender composition.

36. The process for preparing a polyurethane, in particular a thermoplastic polyurethane, according to any of embodiments 32 to 34, comprising the reaction of the components (i) to (iii):
(i) a diisocyanate composition comprising at least 4,4'-MDI or HDI;
(ii) a polyol composition, comprising
    (ii.1) at least one polyether diol, preferably PTHF, or one polyester diol, wherein the polyether diol or polyester diol has a number-average molecular weight in the range from 500 to 3000 g/mol,
    (ii.2) at least one polysiloxane of general formula Ia

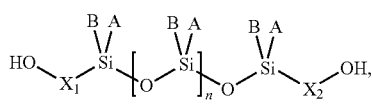

(Ia)

where n is an integer in the range from 10 to 20, A and B are both methyl Groups; X1 is a (CH2-CH2-O—)m group, X2 is an (O—CH2-CH2)m group, where M for X1, X2 in each case independently is an integer in the range from 3 to 15;

(iii) a chain extender composition comprising at least one diol or diamine selected from the group consisting of butane-1,4-diol, hexane-1,6-diol, ethane-1,2-diol and 2,4-diamino-3,5-di(methylthio)toluene.

37. The process for preparing a polyurethane, in particular a thermoplastic polyurethane, according to any of embodiments 32 to 34, comprising the reaction of the components (i) to (iii):
(i) a diisocyanate composition comprising at least MDI;
(ii) a polyol composition, comprising
    (ii.1) at least one polyether diol, preferably PTHF, having a number-average molecular weight in the range from 500 to 3000 g/mol,
    (ii.2) at least one polysiloxane of general formula Ia

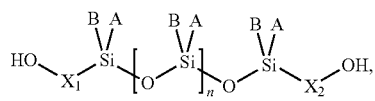

(Ia)

where n is an integer in the range from 10 to 20, A and B are both methyl groups; X₁ is a (CH₂—CH₂—O—)ₘ group, X₂ is an (O—CH₂—CH₂)ₘ group, where m for X₁, X₂ is identical and is an integer in the range from 3 to 15;

(iii) a chain extender composition comprising at least butane-1,4-diol.

38. The process for preparing a polyurethane, in particular a thermoplastic polyurethane, according to any of embodiments 32 to 34, comprising the reaction of the components (i) to (iii):
(i) a diisocyanate composition comprising at least HDI;
(ii) a polyol composition, comprising
    (ii.1) at least one polyether diol, preferably PTHF, having a number-average molecular weight in the range from 500 to 3000 g/mol,
    (ii.2) at least one polysiloxane of general formula Ia

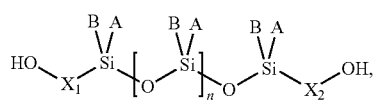

(Ia)

where n is an integer in the range from 10 to 20, A and B are both methyl groups; X₁ is a (CH₂—CH₂—O—)ₘ group, X₂ is an (O—CH—CH₂)ₘ group, where m for X₁, X₂ is identical and is an integer in the range from 3 to 15;

(iii) a chain extender composition comprising at least hexane-1,6-diol.

39. The process for preparing a polyurethane, in particular a thermoplastic polyurethane, according to any of embodiments 32 to 34, comprising the reaction of the components (i) to (iii):
(i) a diisocyanate composition comprising at least 4,4'-MDI;

(ii) a polyol composition, comprising
  (ii.1) at least one polyester diol having a number-average molecular weight $M_n$ in the range from 500 to 3000 g/mol,
  (ii.2) at least one polysiloxane of general formula Ia

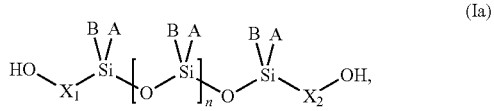

where n is an integer in the range from 10 to 20, A and B are both methyl groups; $X_1$ is a $(CH_2—CH_2—O—)_m$ group, $X_2$ is an $(O—CH_2—CH_2)_m$ group, where m for $X_1$, $X_2$ is identical and is an integer in the range from 3 to 15;
(iii) a chain extender composition comprising at least butane-1,4-diol.

40. The process for preparing a polyurethane, in particular a thermoplastic polyurethane, according to any of embodiments 32 to 34, comprising the reaction of the components (i) to (iii):
(i) a diisocyanate composition comprising at least 4,4'-MDI;
(ii) a polyol composition, comprising
  (ii.1) at least one polyether diol, preferably PTHF, having a number-average molecular weight in the range from 500 to 3000 g/mol,
  (ii.2) at least one polysiloxane of general formula Ia

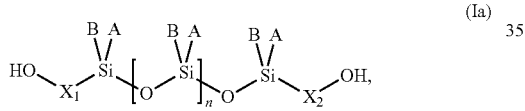

where n is an integer in the range from 10 to 20, A and B are both methyl groups; $X_1$ is a $(CH_2—CH_2—O—)_m$ group, $X_2$ is an $(O—CH—CH_2)_m$ group, where m for $X_1$, $X_2$ is identical and is an integer in the range from 3 to 15;
(iii) a chain extender composition comprising at least ethane-1,2-diol or 2,4-diamino-3,5-di(methythio)toluene, preferably 2,4-diamino-3,5-di(methylthio)toluene.

41. The process for preparing a polyurethane, in particular a thermoplastic polyurethane, according to any of embodiments 32 to 40, comprising the reaction of the components (i) to (iii) and additionally
(iv) an antioxidant composition, where the antioxidant composition comprises at least one antioxidant selected from the sterically hindered phenols, preferably selected from the sterically hindered phenols having a tert-butyl group at least in the ortho position adjacent to the OH group, more preferably selected from the group consisting of ethylenebis(oxyethylene) bis(3-(5-tert-butyl-4-hydroxy-m-tolyl)propionate) (Irganox 245 FF, CAS number 36443-68-2), octadecyl 3-(3,5-di-tert-butyl-4-hydroxyphenyl)propionate (Irganox 1076, CAS number 2082-79-3), octyl 3,5-di-tertbutyl-4-hydroxyhydrocinnamate (Irganox 1135, CAS number 125643-61-0), N,N'-hexane-1,6-diylbis[3-(3,5-di-tert-butyl-4-hydroxyphenylpropionamide] (Irganox 1098, CAS number 23128-74-7), pentaerythritol tetrakis(3-(3,5-di-tert-butyl-4-hydroxyphenyl)propionate) (Irganox 1010, CAS number 6683-19-8) and 3,5-bis(tert-butyl)-4-hydroxytoluene (BHT, CAS number 128-37-0), more preferably selected from the group consisting of pentaerythritol tetrakis(3-(3,5-di-tert-butyl-4-hydroxyphenyl)propionate), N,N'-hexane-1,6-diylbis[3-(3,5-di-tert-butyl-4-hydroxyphenylpropionamide] and a mixture of pentaerythritol tetrakis(3-(3,5-di-tert-butyl-4-hydroxyphenyl)propionate) and N,N'-hexane-1,6-diylbis[3-(3,5-di-tert-butyl-4-hydroxyphenylpropionamide].

42. The use of a polyurethane, in particular a thermoplastic polyurethane, according to any of embodiments 1 to 31 or of a polyurethane, in particular a thermoplastic polyurethane, obtainable or obtained by a process according to any of embodiments 32 to 41 for the production of a molded body, an injection-molded product, an extrusion product, or a film.

43. The use of a polyurethane, in particular a thermoplastic polyurethane, according to any of embodiments 1 to 31 or of a polyurethane, in particular a thermoplastic polyurethane, obtainable or obtained by a process according to any of embodiments 32 to 41 for an article selected from the group consisting of consumer articles, preferably selected from the group consisting of items of clothing, especially footwear and footwear parts, especially midsoles, outsoles and shoelaces; jewelry and jewelry parts, especially for a smart device or for monitoring electronics, preferably selected from the group consisting of wristbands, wristband parts, lanyards and lanyard parts, body straps and body strap parts, spectacles and spectacle parts; items of sports equipment, especially sport bands, resistance bands; damping materials; foam beads; woven articles; nonwoven articles; cleaning articles for mobile driving or flying devices, especially windshield wipers; medical articles, especially dressing articles, tubes, transdermal systems, parts of a transdermal system, especially plasters, parts of a plaster; furniture parts; cushions, cushion parts; mattresses, mattress parts; automobile accessories, especially automobile cable sheathings or conduits; films, especially flooring films, ski films, protective films; protective covers; design elements for electrical components.

44. An article comprising a polyurethane, in particular a thermoplastic polyurethane, according to any of embodiments 1 to 31 or a polyurethane, in particular a thermoplastic polyurethane, obtainable or obtained by a process according to any of embodiments 32 to 41.

45. A foam bead based on polyurethane, obtained or obtainable from a polyurethane, in particular a thermoplastic polyurethane, according to any of embodiments 1 to 31.

46. The foam bead according to embodiment 45, wherein the polyurethane, in particular the thermoplastic polyurethane, has a hardness in the range from Shore 30A to 98A or in the range from Shore 40D to 64D, preferably in the range from Shore 30A to 95A, more preferably in the range from Shore 70A to 95A.

47. A process for producing foam beads according to embodiment 45 or 46, wherein a polyurethane, in particular a thermoplastic polyurethane, according to any of embodiments 1 to 31 is melted, admixed with a blowing agent, and the blowing agent-containing melt is pelletized while being foamed, preferably at a pressure in the range from 1 to 15 bar, more preferably at a pressure in the range from 5 to 15 bar.

48. The process for producing foam beads according to embodiment 45 or 46, wherein a polyurethane, in particular a thermoplastic polyurethane, according to any of claims 1 to 31 is expanded in the presence of a blowing agent at a pressure in a range from 1 to 15 bar, preferably in the range from 1 to 5 bar.
49. A bead foam obtainable by fusing foam beads according to embodiment 45 or 46 or foam beads obtained or obtainable by the process according to embodiment 47 or 48 by means of water vapor or irradiation with electromagnetic radiation, in particular in the radiofrequency range (9 kHz to 1 THz).
50. A bead foam obtainable by adhesively bonding foam beads according to embodiment 45 or 46 or foam beads obtained or obtainable by the process according to embodiment 47 or 48 using adhesives.
51. The use of a foam bead according to embodiment 45 or 46 or of a foam bead obtained or obtainable by the process according to embodiment 47 or 48 or of a bead foam according to embodiment 49 or 50 for applications in the fields of sport, clothing, construction, automobiles, electronics.
52. The use of a foam bead according to embodiment 45 or 46 or of a foam bead obtained or obtainable by the process according to embodiment 47 or 48 or of a bead foam according to embodiment 49 or 50 for a consumer article, preferably selected from the group consisting of items of clothing, especially footwear and footwear parts, especially midsoles and outsoles; jewelry and jewelry parts, especially for a smart device or monitoring electronics (especially for monitoring bodily functions such as heartbeat, temperature), preferably selected from the group consisting of wristbands, wristband parts, lanyards and lanyard parts, body straps and body strap parts, spectacles and spectacle parts; items of sports equipment, especially sport bands, resistance bands; damping materials; cleaning articles for mobile driving or flying devices, especially windshield wipers; medical articles.
53. A particle foam made from polyurethane, obtained or obtainable from a polyurethane, in particular a thermoplastic polyurethane, according to any of embodiments 1 to 31.
54. The particle foam according to embodiment 53, wherein the average diameter of the particle foam is between 0.2 and 20 mm.
55. The particle foam according to embodiment 53 or 54, wherein the average diameter of the particle foam is between 0.5 to 15 mm.
56. The particle foam according to any of embodiments 53 to 55, wherein the average diameter of the particle foams is between 1 to 12 mm.
57. A process for producing a particle foam according to any of embodiments 53 to 56, comprising
 i. providing the polyurethane, in particular the thermoplastic polyurethane, according to any of embodiments 1 to 31;
 ii. impregnating the polyurethane, in particular the thermoplastic polyurethane, according to any of embodiments 1 to 31 with a blowing agent under pressure;
 iii. expanding the polyurethane, in particular the thermoplastic polyurethane, according to any of embodiments 1 to 31 by means of pressure decrease.
58. A process for producing a molded body, comprising
 (x) introducing the particle foams according to any of embodiments 53 to 56 into an appropriate mold,
 (y) fusing the particle foams from step (x).
59. The process according to embodiment 58, wherein the fusion in step (y) is effected in a closed mold.
60. The process according to embodiment 58 or 59, wherein the fusion in step (y) is effected by means of water vapor, hot air or energetic radiation.
61. A molded body obtained or obtainable by the process according to any of embodiments 58 to 60, wherein the density of the molded body is between 75 to 375 kg/m$^3$.
62. The molded body according to embodiment 61, wherein the molded body is a shoe intermediate sole, shoe insole, shoe combisole, bicycle saddle, bicycle tire, damping element, cushioning, mattress, underlay, grip, protective film, a component in automobile interiors and exteriors, ball, or floor covering, especially for sports surfaces, track and field surfaces, sports halls, children's playgrounds and pathways.
63. The use of a particle foam according to any of embodiments 53 to 56 for the production of a molded body according to embodiment 61 or 62.

CITED LITERATURE

"Kunststoffhandbuch, Band 7, Polyurethane" [Plastics Handbook, volume 7, Polyurethanes], Carl Hanser Verlag, 3rd edition, 1993, chapters 3.1, 3.2 and 3.3.2, pp. 103-113
EP 0 922 552 A1
WO 2006/082183 A1
WO 2005/023920 A1
WO 2007/082838 A1
WO 2013/153190 A1
WO 2014/198779 A1
WO 2010/076224 A1
U.S. Pat. No. 9,097,835 B2
WO 94/20568 A1
WO 2007/082838 A1
WO2017/030835 A1
WO 2013/153190 A1
WO 2010/010010 A1
Saechtling (ed.), Kunststoff-Taschenbuch [Plastics Handbook], 27th edition, Hanser-Verlag Munich 1998, chapters 3.2.1 and 3.2.4
WO 2014/150122 A1
WO 2014/150124 A1
EP 1 979 401 B1
US 2015/0337102 A
EP 2 872 309 B1
EP 3 053 732 A
WO 2016/146537 A1
EP 17198591.4

The examples that follow serve to illustrate the invention, but are in no way limiting with respect to the subject matter of the present invention.

EXAMPLES

1. Chemicals

| Name | Chemical name |
|---|---|
| Isocyanate 1 | diphenylmethane 4,4'-diisocyanate (4,4'-MDI) |
| Isocyanate 2 | hexamethylene 1,6-diisocyanate (HDI) |
| Chain extender 1 | butane-1,4-diol (BDO) |
| Chain extender 2 | hexane-1,6-diol (1,6-HDO) |
| Chain extender 3 | ethane-1,2-diol (MEG) |
| Chain extender 4 | aromatic diamine (>95% by weight 2,4-diamino-3,5-di(methylthio)toluene) |

-continued

| Name | Chemical name |
|---|---|
| Antioxidant 1 | pentaerythritol tetrakis[3-[3,5-di-tert-butyl-4-hydroxyphenyl]propionate |
| Antioxidant 2 | N,N'-1,6-hexanediylbis[3,5-bis(1,1-dimethylethyl)-4-hydroxybenzenepropanamide |
| Antioxidant 3 | mixture of antioxidant 1 and antioxidant 2 in a ratio of 1:1 |
| Antioxidant 3 | mixture of antioxidant 1 and antioxidant 2 |
| Polyol 1 | polytetramethylene ether glycol (PTHF) having an OH number in the range from 109.5-115.1 mg KOH/g |
| Polyol 2 | polyester diol having a hydroxyl number of 56 mg KOH/g formed from adipic acid, butane-1,4-diol and hexane-1,6-diol; number-average molecular weight $M_n$: 2000 g/mol (ADS/BDO/HDO) |
| Hydrolysis stabilizer | polymer based on carbodiimide and polyglycol ether |
| Plasticizer | tributyl O-acetylcitrate |
| Antiblocking agent | ethylenebisstearamide |
| Catalyst 1 | Kosmos ® 29 tin catalyst from Evonik |
| Si polyol 1 | difunctional polyol with 59% PDMS and 41% EO content and having an OH number of 62 mg KOH/g |
| Si polyol 2 | difunctional polyol with 55% PDMS and 45% EO content and having an OH number of 57 mg KOH/g |
| Si polyol 3 | difunctional polyol with 72% PDMS and 28% EO content and having an OH number of 65 mg KOH/g |

PDMS: polydimethylsiloxane
EO: ethylene oxide

2. Measurement Methods

Tensile strength: DIN 53504
Elongation at break: DIN 53504
Tear strength: DIN ISO 34-1 Bb
Tear propagation resistance: DIN ISO 34-1 Bb
Shore hardness: DIN ISO 7619-1
Abrasion determination: DIN ISO 4649
Hot air resistance: DIN 53508
Melt mass-flow rate (MFR): DIN EN ISO 1133 (March 2012 version)

The hard segment content (hard phase content) was determined according to the formula from WO 2010/076224 A1/U.S. Pat. No. 9,097,835 B2:

$$\text{Hard phase content} = \left\{ \sum_{x=1}^{k} [(m_{KVx}/M_{KVx})^* M_{iso} + m_{KVx}] \right\} / m_{ges}$$

having the following definitions:
Mkv$_x$: molar mass of the chain extender x in g/mol
mKV$_x$: mass of the chain extender x in g
M$_{Iso}$: molar mass of the isocyanate used in g/mol
m$_{ges}$: total mass of all starting materials in g
k: number of chain extenders.

3. Example 1—Preparation of an SI-Based Thermoplastic Polyurethane (TPU) with Aromatic Isocyanate 660 g of polyol 1 and 440 g of Si polyol 3 together with 72.28 g of chain extender 1 were weighed into a 2 l tin can and briefly blanketed with nitrogen. The can was sealed with a suitable lid and heated to approx. 90° C. in a heating cabinet. The liquid components in the can were mixed on a lab jack by means of a propeller stirrer. 8.1 g of antioxidant 1 and 8.1 g of antioxidant 2 was subsequently added and the mixture was stirred. 433.61 g of isocyanate 1 were added at 80° C. The overall formulation is shown in table 1. The isocyanate 1 had a temperature of 45° C. Mixing was effected by means of a propeller stirrer at 200 rpm. Upon reaching 110° C., the reaction mixture was poured into a Teflon dish. The Teflon dish was situated on a heating stage at 125° C. After 10 min, the solid slab was removed from the heating stage and subsequently heat-treated for 24 h in a heating cabinet at 80° C. The cooled slab was comminuted in a cutting mill. The resulting pellets were dried at 110° C. for 3 h. 2 mm and 6 mm test specimens were produced by means of injection molding processes and used in accordance with the requirements of the respective DIN standard.

4. Examples 2 to 4—Preparation of Si-Based TPUs with Aromatic Isocyanate

Further Si-based TPUs with aromatic isocyanate were produced analogously to the procedure of example 1, with the individual components being used in the amounts reported in table 1 (formulations).

TABLE 1

Formulations for example 1 and examples 2 to 4

|  | Example 1 | Example 2 | Example 3 | Example 4 |
|---|---|---|---|---|
| Polyol 1 | 660.00 g | 950.00 g | 900.00 g | 880.00 g |
| Si polyol 3 | 440.00 g | 50.00 g | 100.00 g | 220.00 g |
| Chain extender 1 | 72.28 g | 67.82 g | 67.52 g | 73.61 g |
| Isocyanate 1 | 433.61 g | 439.01 g | 432.60 g | 461.78 g |
| Antioxidant 1 | 8.11 g | 7.61 g | 7.58 g | 8.26 g |
| Antioxidant 2 | 8.11 g | 7.61 g | 7.58 g | 8.26 g |

5. Determination of the Mechanical Properties of SI-Based TPUs with Aromatic Isocyanate The tensile strength, the elongation at break and the Shore hardness were measured, and the hard segment content and the abrasion determined, for the test specimens according to example 1 and examples 2, 3 and 4. Table 2 below shows the results of the tests.

TABLE 2

Results of the mechanical investigations for the Si-based TPUs with aromatic isocyanate according to example 1 and examples 2, 3 and 4

|  | Si polyol 3 | Hard segment content | Tensile strength | MFR (190° C./21.6 kg) [g/10 min] |
|---|---|---|---|---|
| Example 1 | 40% by weight | 17% by weight | not injection-moldable | flows through |
| Example 2 | 5% by weight | 17% by weight | >35 MPa | 40 |

TABLE 2-continued

Results of the mechanical investigations for the Si-based TPUs with aromatic isocyanate according to example 1 and examples 2, 3 and 4

| | | | | |
|---|---|---|---|---|
| Example 3 | 10% by weight | 17% by weight | >35 MPa | 80.4 |
| Example 4 | 20% by weight | 17% by weight | >15 MPa | flows through |

| | Elongation at break | Tear strength | Shore hardness (Shore A) | Abrasion |
|---|---|---|---|---|
| Example 1 | not injection-moldable | not injection-moldable | not injection-moldable | not injection-moldable |
| Example 2 | >500% | >40 kN/m | <75A | <15 mm³ |
| Example 3 | >500% | >40 kN/m | <75A | <15 mm³ |
| Example 4 | >500% | >35 kN/m | <75A | <15 mm³ |

It has surprisingly been found that, for an Si-based TPU having a content of Si polyol, in particular Si polyol 3, in the range from 5-30% by weight, in particular from 5-20% by weight, there was a significant improvement in the mechanical properties, in particular the tensile strength, elongation at break and tear strength, in comparison to an Si-based TPU having a content of 40% by weight. The abrasion was below 15 mm³ for all examples; this is a surprising improvement over standard TPUs not comprising any polysiloxane and also having a Shore A hardness of 70.

6. Example 5—Preparation of an SI-Based TPU with Aliphatic Isocyanate

An Si-based TPU having a content of 40% by weight of Si polyol 3 was produced according to the procedure from example 1, the amounts of the components used being shown in table 3. Instead of the aromatic isocyanate 1 from comparative example 1, the aliphatic isocyanate 2 was used. Production of the test specimens was not possible since the TPU could not be processed by means of injection molding processes.

7. Examples 6 to 8—Preparation of SI-Based TPUs with Aliphatic Isocyanate

Si-based TPUs having a content of Si polyol 3 in the range from 5% to 20% by weight were produced according to the procedure for example 1, the amounts of the components used being shown in table 3. Instead of the aromatic isocyanate 1 from example 1, the aliphatic isocyanate 2 was used. 2 mm and 6 mm test specimens were produced by means of injection molding processes according to the procedure from comparative example 1.

TABLE 3

Formulations for example 5 and examples 6 to 8

| | Example 5 | Example 6 | Example 7 | Example 8 |
|---|---|---|---|---|
| Polyol 1 | 600.00 g | 950.00 g | 900.00 g | 800.00 g |
| Si polyol 3 | 400.00 g | 50.00 g | 100.00 g | 200.00 g |
| Chain extender 2 | 96.51 g | 98.76 g | 98.45 g | 97.81 g |
| Isocyanate 2 | 279.21 g | 309.04 g | 304.85 g | 296.47 g |
| Catalyst 1 in 50% dioctyl adipate(DOA) | 688 μl | 704 μl | 702 μl | 697 μl |
| Antioxidant 1 | 6.95 g | 7.12 g | 7.58 g | 8.26 g |
| Antioxidant 2 | 6.95 g | 7.12 g | 7.58 g | 8.26 g |

8. Determination of the Mechanical Properties of SI-Based TPUs with Aliphatic Isocyanate The tensile strength, the elongation at break, tear strength and Shore hardness were measured and the hard segment content determined for the test specimens according to example 5 and examples 6 to 8. Table 4 below shows the results of the tests.

TABLE 4

Results of the mechanical investigations for the Si-based TPUs with aliphatic isocyanate of example 5 and examples 6 to 8.

| | Si polyol 3 [% by weight] | Hard segment content [% by weight] | Tensile strength | MFR (190° C./3.8 kg) [g/10 min] |
|---|---|---|---|---|
| Example 5 | 40 | 17 (not injection-moldable) | n.m. | 214.7 |
| Example 6 | 5 | 17 | >20 MPa | 28.8 |
| Example 7 | 10 | 17 | >20 MPa | 54.07 |
| Example 8 | 20 | 17 | >15 MPa | 116.98 |

| | Elongation at break | Tear strength | Shore hardness (Shore A) |
|---|---|---|---|
| Example 5 | n.m. | n.m. | n.m. |
| Example 6 | >500% | >30 kN/m | <90A |

TABLE 4-continued

Results of the mechanical investigations for the Si-based TPUs
with aliphatic isocyanate of example 5 and examples 6 to 8.

| Example 7 | >500% | >30 kN/m | <90A |
|---|---|---|---|
| Example 8 | >500% | >30 kN/m | <90A | n.m.: not measurable

The Si-based TPUs with aliphatic isocyanate had, for an Si polyol content in the range from 1% to 30% by weight, preferably in the range from 5% to 20% by weight, improved tensile strength of in each case >15 MPa and a tear strength of >30 kN/m.

9. Comparative Example 1—Preparation of a TPU with Aromatic Isocyanate without SI Polyol A TPU without Si polyol was produced according to the procedure from example 1, the amounts of the components used being shown in table 5. 2 mm and 6 mm test specimens were produced by means of injection molding processes according to the procedure from example 1.

10. Examples 9 and 10—Preparation of Si-Based TPUs with Aromatic Isocyanates and Various Si Polyols Si-based TPUs having a content of Si polyol 2 (example 7, 10% by weight) or Si polyol 1 (example 8, 20% by weight) in the range from 10% to 20% by weight were produced according to the procedure from comparative example 1, the amounts of the components used being shown in table 5. 2 mm and 6 mm test specimens were produced by means of injection molding processes according to the procedure from example 1.

TABLE 5

Formulations for comparative example 1 and examples 9 and 10

|  | Comparative example 1 | Example 9 | Example 10 |
|---|---|---|---|
| Polyol 2 | 1000.00 g | 720.00 g | 640.00 g |
| Si polyol | — | 2 | 1 |
| Amount of Si polyol | 0.00 g | 80.00 g | 160.00 g |
| Chain extender 1 | 164.3 g | 164.28 g | 164.62 g |
| Isocyanate 1 | 560.00 g | 560.0 g | 560.0 g |
| Hydrolysis stabilizer | 6.40 g | 6.4 g | 6.4 g |

11. Determination of the Thermal Stability of Si-Based TPUs with Aromatic Isocyanate (Long-Term Test)

The test specimens of comparative example 1 and examples 9 and 10 were subjected to long-term hot air aging tests and tested for their resistance to hot air. To this end, all test specimens were stored in air at 165° C. for 3000 hours, the elongation at break was determined prior to this and afterwards. The results are shown in table 6.

TABLE 6

Elongation at break values for comparative example 1 and examples 9 and 10, in each case before and after thermal aging (long-term test)

|  | Shore hardness (Shore A) before thermal aging | Elongation at break before thermal aging | Elongation at break after thermal aging | MFR (220° C./ 2.16 kg) [g/10 min] |
|---|---|---|---|---|
| Comparative example 1 | 95A | >500% | test specimen melted | 7.13 |
| Example 9 | 95A | >500% | >300% | 65.7 |
| Example 10 | 95A | >500% | >300% | 103.5 |

It could be observed that thermal aging for the test specimen of comparative example 1 resulted in deformation and that after 2000 hours of storage at 165° C. elongation at break had fallen below 50%. In contrast to this, the test specimens of examples 9 and 10, which both comprised 10% to 20% by weight of Si polyol, exhibited an elongation at break after the thermal aging of greater than 50% compared to the elongation at break before thermal aging. The incorporation of an Si polyol thus evidentially results in an improvement in the aging properties.

12. Comparative Example 2—Preparation of a TPU with Aromatic Isocyanate without Si Polyol A TPU without Si polyol was produced according to the procedure from example 1, the amounts of the components used being shown in table 7. 2 mm and 6 mm test specimens were produced by means of injection molding processes according to the procedure from comparative example 1.

13. Examples 11 and 12—Preparation of Si-Based TPUs with Aromatic Isocyanate and Various Si Polyols, and Also Various Chain Extenders Si-based TPUs having a content of Si polyol 2 of 10% by weight (example 11) or 20% by weight (example 12) were produced according to the procedure from comparative example 1, the amounts of the components used being shown in table 7. 2 mm and 6 mm test specimens were produced by means of injection molding processes according to the procedure from example 1.

TABLE 7

Formulations for comparative example 2 and examples 11 and 12

|  | Comparative example 2 | Example 11 | Example 12 |
|---|---|---|---|
| Polyol 1 | 900.00 g | 765.00 g | 680.00 g |
| Si polyol 2 | 0.00 g | 85.00 g | 170.00 g |
| Chain extender 3 (diol) | 33.26 g | 0 | 0 |

TABLE 7-continued

Formulations for comparative example 2 and examples 11 and 12

|  | Comparative example 2 | Example 11 | Example 12 |
|---|---|---|---|
| Chain extender 4 (diamine) | 0.0 g | 118.62 g | 128.72 g |
| Plasticizer | 335.5 g | 343.68 | 346.31 g |
| Isocyanate 1 | 372.15 g | 351.48 g | 351.48 |
| Antiblocking agent | 9.73 g | 9.97 g | 10.04 g |
| Antioxidant 1 | 8.11 g | 8.6 g | 8.66 g |
| Antioxidant 2 | 8.11 g | 8.6 g | 8.66 g |

14. Determination of the Thermal Stability of Si-Based TPUs with Aromatic Isocyanate (Accelerated Test)

The test specimens of comparative example 2 and examples 11 and 12 were subjected to accelerated hot air aging tests and tested for their resistance to hot air. To this end, all test specimens were stored in air at 200° C. for 6 hours, the elongation at break was determined prior to this and afterwards. The results are shown in table 8.

TABLE 8

Elongation at break values for comparative example 2 and examples 11 and 12, in each case before and after thermal aging (accelerated test)

|  | Shore hardness (Shore A) before thermal aging | Elongation at break before thermal aging | Elongation at break after thermal aging | MFR 190° C./ 10 kg [g/10 min] |
|---|---|---|---|---|
| Comparative example 2 | 55A | >500% | melted | 26.6 |
| Example 11 | 55A | >400% | >300% | 89.0 |
| Example 12 | 55A | >500% | >300% | 330 |

The mechanical performance of a TPU having a low Shore A hardness (55A) and which did not have any Si polyol (comparative example 2) was significantly impaired by the thermal aging even in the accelerated test—the test specimen melted within just a few minutes. In contrast to this, the Si-based TPUs, in this case with Si polyol 2 especially in combination with chain extender 4, even though they had a Shore A hardness of only 55A, displayed only a minor deterioration in the elongation at break in the thermal aging—even after 6 hours this still remained above 300%; in addition the test specimens of examples 11 and 12 both remained dimensionally stable. Since standard TPU materials in the standard case are molten at temperatures above 180° C., this is very good aging performance which is brought about by the incorporation of the Si polyol, especially in combination with the diamine chain extender 4.

15. Example 13 and Comparative Example 3—Preparation of eTPU

15.1 Preparation of the TPU

The TPUs of example 13 and comparative example 3 were prepared as follows on a reaction extruder. A mixture of the chain extender 3, polyol 1, and also optionally the Si polyol 3 and a catalyst at a charge temperature of 160° C. on the one hand, and, separately from this, the diphenylmethane 4,4'-diisocyanate at a charge temperature of 65° C., and the phenolic antioxidant 3, was metered into the first barrel of a ZSK 58 twin-screw extruder from Coperion—Werner & Pfleiderer, having a processing length of 48 D. The speed of the twin screw was 200 rpm. The set temperature values for the barrels in the downstream direction were between 200 and 230° C. in the first third of the screw, between 210 and 190° C. in the second third of the screw and 190-200° C. in the third and final third of the screw. The output was 200 kg/h. After chopping of the melt by means of underwater pelletization and integrated centrifugal drying, the pellets were subjected to final drying at approx. 80 to 90° C. Table 9 shows the composition of the TPUs, the masses of all constituents being reported in grams.

TABLE 9

Composition of the TPUs of example 13 and comparative example 3

| Composition | Example 13 | Comparative example 3 |
|---|---|---|
| Polyol 1 [g] | 900.00 | 1000 |
| Si polyol 3 [g] | 100.00 | — |
| Isocyanate 1 [g] | 633.28 | 610.6 |
| Chain extender 1 [g] | 140.49 | 133.0 |
| Antioxidant 3 [g] | 17.880 | 18.0 |
| Index | 1000 | 985 |
| MFR (190° C./21.6 kg) after 2 h/ 110° C. [g/10 min] | 70 | 63 |
| Shore hardness | 85A | n.d. | n.d.: not determined

TABLE 10

Composition of the TPUs of examples 14 and 15

| Composition | Example 14 | Example 15 |
|---|---|---|
| Polyol 1 [g] | 900.00 | 900.00 |
| Si polyol 3 [g] | 100.00 | 100.00 |
| Isocyanate 1 [g] | 432.45 | 685.64 |
| Chain extender 1 [g] | 69.35 | 160.52 |
| Antioxidant 3 [g] | 15.16 | 18.62 |
| Index | 1000 | 1000 |
| Shore hardness | 70A | 90A |

15.2 Preparation of the eTPU 99 parts by weight of a dried thermoplastic polyurethane (TPU) and 1 part by weight of a TPU which had been admixed in a separate extrusion process with diphenylmethane 4,4'-diisocyanate having an average functionality of 2.05 were mixed and melted in a twin-screw extruder having a screw diameter of 44 mm and a length-to-diameter ratio of 42. After melting, a mixture of $CO_2$ (2 parts by weight) and $N_2$ (0.2 parts by weight) was added as blowing agent. In the course of passage through the rest of the extruder length, the blowing agent and the polymer melt were mixed with one another, so as to form a homogeneous mixture. The total throughput of the extruder, which included a TPU, to which diphenylmethane 4,4'-diisocyanate having an average functionality of 2.05 had been added in a separate extrusion process, and the blowing agent, was 40 kg/h. The melt mixture was subsequently forced using a gear pump (GP) via a diverter valve with screen changer (DV) into a die plate (DP), and cut into pellets in the cutting chamber of the underwater pelletization system (UWP) and transported away with the temperature-controlled and pressurized water and expanded in the process. After separating the expanded pellets from the water by means of a centrifugal dryer, the expanded pellets were dried at 60° C. for 3 h. The temperatures used for the installation parts are listed in table 11 for comparative example 3 and example 13.

TABLE 11

Temperature data of the installation parts for comparative example 3 and example 13

| | Temperature range in the extruder (° C.) | Temperature range of the GP (° C.) | Temperature range of the DV (° C.) | Temperature range of the DP (° C.) |
|---|---|---|---|---|
| Comparative example 3 | 160-220 | 160-200 | 160-200 | 220 |
| Example 13 | 180-220 | 180 | 180 | 220 |

The water temperature and water pressure used for example 13 and comparative example 3 and also the resulting bulk densities of the expanded pellets are listed in table 12.

TABLE 12

Water temperature and water pressure and the resulting bulk densities of the expanded pellets of example 13 and comparative example 3

| | Particle mass (mg) | Bulk density (g/l) | Water pressure in the UWP (bar) | Water temperature in the UWP (° C.) |
|---|---|---|---|---|
| Comparative example 3 | 26 | 180 | 15 | 45 |
| Example 13 | 26 | 190 | 15 | 50 |

15.2.1 Preparation of the eTPU Based on TPU Having Different Shore Hardnesses 99 parts by weight of a dried thermoplastic polyurethane (TPU) and 1 part by weight of a TPU which had been admixed in a separate extrusion process with diphenylmethane 4,4'-diisocyanate having an average functionality of 2.05 were mixed and melted in a twin-screw extruder having a screw diameter of 18 mm and a length-to-diameter ratio of 40. After melting, a mixture of $CO_2$ and $N_2$ was added as blowing agent. In the course of passage through the rest of the extruder length, the blowing agent and the polymer melt were mixed with one another, so as to form a homogeneous mixture. The total throughput of the extruder, which included a TPU, to which diphenylmethane 4,4'-diisocyanate having an average functionality of 2.05 had been added in a separate extrusion process, and the blowing agent, was 1.75 kg/h. The melt mixture was subsequently forced using a gear pump (GP) via a diverter valve with screen changer (DV) into a die plate (DP), and cut into pellets in the cutting chamber of the underwater pelletization system (UWP) and transported away with the temperature-controlled and pressurized water and expanded in the process. After separating the expanded pellets from the water by means of a centrifugal dryer, the expanded pellets were dried at 60° C. for 3 h. The amounts of blowing agent used and also the temperatures set for the installation parts are listed in table 13.

TABLE 13

Temperature data of the installation parts for comparative example 3 and example 13

| | $CO_2$ parts by weight | $N_2$ parts by weight | Temperature range in the extruder (° C.) | Temperature range of the GP (° C.) | Temperature range of the DV (° C.) | Temperature range of the DP (° C.) |
|---|---|---|---|---|---|---|
| Example 14 | 1.6 | 0.3 | 170-215 | 185 | 200 | 200 |
| 90 A Example 15 | 1.75 | 0.3 | 200-220 | 200 | 210 | 230 |

The water temperature and water pressure used for example 14 and example 15 and also the resulting bulk densities of the expanded pellets are listed in table 14.

TABLE 14

Water temperature and water pressure and the resulting bulk densities of the expanded pellets of example 14 and comparative example 15

| | Particle mass (mg) | Bulk density (g/l) | Water pressure in the UWP (bar) | Water temperature in the UWP (° C.) |
|---|---|---|---|---|
| Example 14 | 3.3 | 136 | 15 | 40 |
| 90 A Example 15 | 3.3 | 142 | 15 | 40 |

16. Dirt Repellency and Easier Cleaning of the eTPUs

Samples of the expanded pellets of example 13 and comparative example 3 were stored with dirt for two weeks in a suspension of 5 g of potting soil and 50 ml of tap water under constant agitation in a screwtop bottle at room temperature. After dirtying, the samples were rinsed under cold running water for 1 minute, without using additional chemical or mechanical cleaning agents. Dirt residue was assessed visually and is listed in table 15.

TABLE 15

Dirt residue after cleaning the samples after dirt storage (visual assessment).

| | Example 13 (with Si polyol) | Comparative example 3 (without Si polyol) |
|---|---|---|
| Cleanability | 0 | ++ |

++ very dirty/+ dirty/0 no residue and no discolorations of the surface

Comparative example 3 shows distinct soiling of the surface after cleaning. The Si polyol-containing expanded pellets of example 13 were surprisingly very easy to clean and displayed no discolorations of the surface even after storage, that is to say the dirt repellency of the silicone-modified eTPUs was significantly better. This saves an additional coating step in the production of the end products.

17. Examples 16 to 18—Preparation of SI-Based TPUs with Aromatic Isocyanate and Various Hard Segment Contents/Various Contents of SI Polyol Further Si-based TPUs with aromatic isocyanate were prepared analogously to the procedure of example 1, with the individual components being used in the amounts reported in table 16 (formulations); Si polyol 3 and polyol 1 were in this case always consistently used in the Si polyol 3:polyol 1 weight ratio of 4:1.

TABLE 16

Formulations for examples 16 to 18

| | Example 16 [g] | Example 17 [g] | Example 18 [g] |
|---|---|---|---|
| Polyol 1 | 200 | 160 | 130 |
| Si polyol 3 | 800 | 640 | 520 |
| Chain extender 1 | 102.55 | 164.08 | 199.98 |
| Isocyanate 1 | 446.77 | 585.24 | 660.61 |
| Antioxidant 1 | 7.82 | 7.82 | 7.63 |
| Antioxidant 2 | 7.82 | 7.82 | 7.63 |

For the test specimens of examples 16 to 18, the tear propagation resistance, the elongation at break and the Shore hardnesses A and D were measured and the hard segment content was determined. Table 17 below shows the results of the tests.

TABLE 17

Results of the mechanical investigations for the Si-based TPUs having various hard segment contents of examples 16 to 18

| | Hard segment content [% by weight] | Shore A | Shore D | Tensile strength [MPa] | Elongation at break [%] | Tear propagation resistance [kN/m] |
|---|---|---|---|---|---|---|
| Example 16 | 25 | 74 | 15 | / | / | 6 |
| Example 17 | 40 | 94 | 36 | 7 | 20 | 13 |
| Example 18 | 50 | 98 | 57 | 19 | 240 | 87 |

It was surprisingly found that for an Si-based TPU having a high polysiloxane diol content, of 80% by weight based on the polyol content in examples 16-18, the mechanical properties, in particular the tensile strength, elongation at break and the tear propagation resistance, deteriorate significantly. The examples given above show that this can be observed for a wide range of the hard segment content.

The invention claimed is:

1. A polyurethane, obtained by reacting at least components (i) to (iii):
   (i) a polyisocyanate composition;
   (ii) a polyol composition, comprising
      (ii.1) a polyester diol or polyether diol having a number-average molecular weight in a range from 500 to 3000 g/mol, and
      (ii.2) a polysiloxane of formula I:

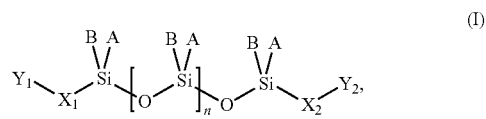

(I)

where n is an integer in a range from 1 to 250, A and B are independently selected from the group of the C1-C20-alkyl groups, where $X_1$ of the polysiloxane as per (ii.2) is a $(CH_2—CH_2—O)_m$ group, a $(CH_2—CH_2—CH_2—O)_m$ group, or a $(CH_2—CHCH_3—O)_m$ group, $X_2$ of the polysiloxane as per (ii.2) is a $(CH_2—CHCH_3—O)_m$ group, an $(O—CH_2—CH_2)_m$ group, or an $(O—CH_2—CH_2—CH_2)_m$ group, where m for $X_1$ and $X_2$ in each case independently is an integer in a range from 2 to 20; and $Y_1$ and $Y_2$ are both a hydroxyl group;
   wherein the polysiloxane as per (ii.2) is present in a proportion in a range from 5% to 20% by weight, based on a total weight of all of components (ii.1) and (ii.2); and
   (iii) a chain extender composition.

2. The polyurethane according to claim 1, having a melt mass-flow rate, determined according to DIN EN ISO 1133 in the March 2012 version and measured at a temperatein a range from 190 to 220° C. and at a mass in a range from 1 to 30 kg, in a range from 20 to 350 g/10 min.

3. The polyurethane according to claim 1, wherein n of the polysiloxane as per (ii.2) is an integer in a range from 3 to 50 or in a range from 100 to 240.

4. The polyurethane according to claim 1, wherein A and B of the polysiloxane as per) are independently selected from the group of the $C_1$- to C5-alkyl groups.

5. The polyurethane according to claim 1, wherein the polysiloxane as per (ii.2) is present in a proportion in a range from 7% to 20% by weight, based on a total weight of all of components (ii.1) and (ii.2).

6. The polyurethane according to claim 1 wherein the polyurethane has a hard segment content in a range from 10% to 50% by weight, based on a total weight of all of components (i), (ii), (iii).

7. The polyurethane according to claim 1, wherein the polyurethane has a hardness in a range from Shore 30A to 98A or in a range from Shore 40D to 64D.

8. The polyurethane according to claim 1, obtained by reacting at least components (i) to (iii):
  (i) a diisocyanate composition comprising at least 4,4'-MDI or HDI;
  (ii) a polyol composition, comprising
    (ii.1) a polyether diol or a polyester diol, wherein the polyether diol or polyester diol has a number-average molecular weight in a range from 500 to 3000 g/mol, and
    (ii.2) a polysiloxane of formula Ia:

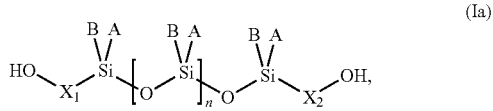

where n is an integer in a range from 10 to 20, A and B are both methyl groups; $X_1$ is a $(CH_2—CH_2—O)_m$ group, $X_2$ is an $(O—CH_2—CH_2)_m$ group, where m for $X_1$ and $X_2$ in each case independently is an integer in a range from 3 to 15;
  (iii) a chain extender composition comprising at least one diol or diamine selected from the group consisting of butane-1,4-diol, hexane-1,6-diol, ethane-1,2-diol and 2,4-diamino-3,5-di(methylthio)toluene.

9. A process for preparing a polyurethane according to claim 1, the process comprising reacting components (i) to (iii):
  (i) a polyisocyanate composition;
  (ii) a polyol composition, comprising
    (ii.1) a polyester diol or polyether diol having a number-average molecular weight in a. range from 500 to 3000 g/mol, and
    (ii.2) a polysiloxane of formula I

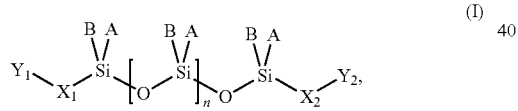

where n is an integer in a range from 1 to 250, A and B are independently selected from the group of the C1-C20-alkyl groups, where $X_1$ of the polysiloxane as per (ii.2) is a $(CH_2—CH_2—O)_m$ group, a $(CH_2—CH_2—CH_2—O)_m$ group, or a $(CH_2—CHCH_3—O)_m$ group, X2 of the polysiloxane as per (ii.2) is an $(O—CHCH_3—CH_2)_m$ group, an $(O—CH_2—CH_2)_m$ group, or an $(O—CH_2—CH_2—CH_2)_m$ group, where m for $X_1$ and $X_2$ in each case independently is an integer in a range from 2 to 20; and $Y_1$ and $Y_2$ are both a hydroxyl group; and
  (iii) a chain extender composition.

10. A molded body, an injection-molded product, an extrusion product, or a film, comprising the polyurethane according to claim 1.

11. An article, comprising the polyurethane according to claim 1,
  wherein the article is a consumer article.

12. An article, comprising a polyurethane obtained by the process according to claim 9.

13. A foam bead based on polyurethane, obtained from a polyurethane according to claim 1, wherein the polyurethane is obtained by reacting at least components (i) to (ii):
  (i) a polyisocyanate composition; and
  (ii) a polyol composition, comprising
    (ii.1) a polyester diol or polyether diol aving a number-average molecular weight in a range from 500 to 3000 g/mol, and
    (ii.2) a polysiloxane having two terminal hydroxyl groups.

14. The foam head based on polyurethane according to claim 13, wherein the polyurethane is obtained by reacting at least components (i) to (iii):
  (i) a polyisocyanate composition;
  (ii) a polyol composition, comprising
    (ii.1) a polyester diol or polyether diol having a number-average molecular weight in a range from 500 to 3000 g/mol, and
    (ii.2) a polysiloxane having two terminal isocyanate-reactive functionalities selected from the group consisting of a thio group, a hydroxyl group and an amino group; and
  (iii) a chain extender composition.

15. The foam bead based on polyurethane according to claim 13, wherein the polyurethane is obtained by reacting at least components (i) to (ii):
  (i) a polyisocyanate composition;
  (ii) a polyol composition, comprising
    (ii.1) a polyester diol or polyether diol having a number-average molecular weight in a range from 500 to 3000 g/mol, and
    (ii.2) a polysiloxane of formula I:

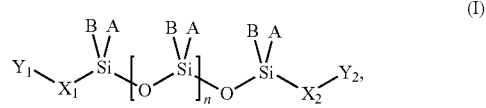

where n is an integer in a range from 1 to 250, A and B are independently selected from the group of the C1-C20-alkyl groups; $X_1$ is selected from the group consisting of $(CH_2—CH_2—O)_m$ group, $(CH_2—CH_2—CH_2—O)_m$ group, $(CH_2)_m—O$ group, and $(CH_2)_m$ group, $X_2$ is selected from the group consisting of $(O—CH_2—CH_2)_m$ group, $(O—CHCH_3—CH_2)_m$ group, $(O—CH_2—CH_2—CH_2)_m$ group, $O—(CH_2)_m$ and $—(CH_2)_m$ group, where in for $X_1$ and $X_2$ in each case independently is an integer in a range from 2 to 20; and $Y_1$, $Y_2$ are hydroxyl groups; and
  (iii) a chain extender composition.

16. The foam bead based on polyurethane according to claim 13, wherein n of the polysiloxane as per (ii.2) integer in a range from 3 to 50 or in a range from 100 to 240.

17. The foam bead based on polyurethane according to claim 13, wherein A and B of the polysiloxane as per (ii.2) are independently selected from the group of the C1- to C5-alkyl groups.

18. The foam bead based on polyurethane according to claim 13. wherein the polyurethane has a hard segment content in a range from 10% to 50% by weight based on a total weight of all of components (i), (ii), (iii).

19. The foam bead based on polyurethane according to claim 13. wherein the polyurethane has a hardness in a range from Shore 30AA to 98A or in a range from Shore 40D to 64D.

20. The foam bead based on polyurethane according to claim 13, wherein the polyurethane is obtained by reacting at least components (i) to (iii):

(i) a diisocyanate composition comprising at least 4,4'-MDI or HDI;
(ii) a polyol composition, comprising
(ii.1) a polyether diol or a polyester diol, wherein the polyether diol or polyester diol has a number-average molecular weight in a range from 500 to 3000 g/mol, and
(ii.2) a polysiloxane of formula Ia.:

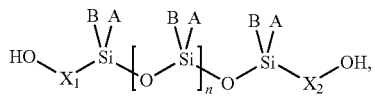

(Ia)

where n is an integer in a range from 10 to 20, A and B are both methyl groups; $X_1$ is $(CH_2—CH_2—O—)_m$ group. $X_2$ is an $(O—CH_2—CH_2)_m$ group, where m for $X_1$ and $X_2$ in each case independently is an integer in a range from 3 to 15,
(iii) a chain extender composition comprising at least one diol or diamine selected from the group consisting of butane-1,4-diol, hexane-1,6-diol, ethane-1,2-diol and 2,4-diamino-3,5-di(methylthio)toluene.

21. The foam bead according to claim 13, wherein the polyurethane has a hardness in a range from Shore 30A to 98A or in a range from Shore 40D to 64D.

22. A process for producing the foam beads according to claim 13, the process comprising:
melting the polyurethane, thereby obtaining the melted polyurethane,
mixing the melted polyurethane with a blowing agent, thereby forming a blowing agent-containing melt, and
pelletizing the blowing agent-containing melt while foaming at a pressure in a range front 1 to 15 bar.

23. A process for producing the foam beads according to claim 13, the process comprising:
expanding the polyurethane in a presence of a blowing agent at a pressure in a range from 1 to 15 bar.

24. A bead foam obtained by fusing the foam bead according to claim 13 by means of water vapor or irradiation with electromagnetic radiation.

25. A bead foam obtained by adhesively bonding the foam beads according to claim 13.

26. An article, comprising the foam bead according to claim 13 wherein the article is suitable for applications in fields of sport, clothing, construction, automobiles, and electronics.

27. An article, comprising the foam bead according to claim 13, wherein the article is selected from the group consisting of consumer articles.

\* \* \* \* \*

UNITED STATES PATENT AND TRADEMARK OFFICE
CERTIFICATE OF CORRECTION

PATENT NO. : 11,535,697 B2
APPLICATION NO. : 16/632230
DATED : December 27, 2022
INVENTOR(S) : Jaehnigen et al.

Page 1 of 1

It is certified that error appears in the above-identified patent and that said Letters Patent is hereby corrected as shown below:

On the Title Page

Item (56), Column 2, Lines 4-6 in OTHER PUBLICATIONS, please delete duplicate reference: "International Preliminary Report on Patentability and Written Opinion dated Jan. 30, 2020 in PCT/EP2018/069622 (with English translation), citing documents AG through AK therein, 17 pages.";

Item (56), Column 2, Lines 7-9 in OTHER PUBLICATIONS, please delete duplicate reference: "International Search Report dated Oct. 31, 2018 in in PCT/EP2018/069622 (submitting English translation only), citing documents AG through AK therein, 3 pages.";

Item (56), Column 2, Line 14 in OTHER PUBLICATIONS, currently reads:
"Henze, O.S."
And should read:
--Henze, O.S.,--;

Item (56) (pg. 2), Column 2, Line 1 in OTHER PUBLICATIONS currently reads:
"U.S. Appl. No. 11/753,096,"
And should read:
--U.S. Appl. No. 11/573,096,--;

Item (56) (pg. 2), Column 2, Line 4 in OTHER PUBLICATIONS, currently reads:
"Kaminsky T., et al."
And should read:
--Kaminsky, T., et al.--; and Item (56) (pg. 2), Column 2, Lines 12-13 in OTHER PUBLICATIONS, currently reads:
"Oct. 31, 2018 in in PCT/EP2018/069622"
And should read:
--Oct. 31, 2018 in PCT/EP2018/069622--.

Signed and Sealed this
Tenth Day of October, 2023

Katherine Kelly Vidal
*Director of the United States Patent and Trademark Office*